United States Patent [19]

James

[11] 4,097,475
[45] Jun. 27, 1978

[54] DISPERSE MONO- AND BISAZO DYES DERIVED FROM 2-AMINO-4,5-DICYANOIMIDAZOLE

[75] Inventor: Daniel Shaw James, Hockessin, Del.

[73] Assignee: E. I. Du Pont de Nemours and Company, Wilmington, Del.

[21] Appl. No.: 457,640

[22] Filed: Apr. 3, 1974

[51] Int. Cl.$^2$ ............... C09B 29/36; C09B 29/38; C09B 31/04
[52] U.S. Cl. .................. 260/157; 260/154; 260/156; 260/160; 260/162; 260/163
[58] Field of Search ............ 260/157, 162, 163, 156, 260/154, 160

[56] References Cited

U.S. PATENT DOCUMENTS

| | | | |
|---|---|---|---|
| 3,133,910 | 5/1964 | Baumann et al. | 260/146 |
| 3,213,080 | 10/1965 | Bloom et al. | 260/155 |
| 3,336,285 | 8/1967 | Towne et al. | 260/155 |
| 3,468,871 | 9/1969 | Leverenz et al. | 260/145 |
| 3,515,715 | 6/1970 | Straley et al. | 260/163 |
| 3,649,162 | 3/1972 | James | 260/157 X |
| 3,763,140 | 10/1973 | Entschel et al. | 260/158 |

Primary Examiner—Daniel E. Wyman
Assistant Examiner—John J. Doll

[57] ABSTRACT

Azo dyes free of water solubilizing groups having the formula

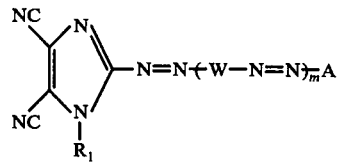

wherein $R_1$ is $C_{1-4}$alkyl, $-CH_2-CH=CH_2$,

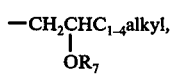

$-(CH_2)_nR_8$, $C_{1-4}$alkyleneCN, $C_2H_4OR_7$, $-CH_2-CH=CH-R_8$, $-C_2H_4CONH_2$, $-C_2H_4CONHC_{1-4}$alkyl, $-C_2H_4CON(C_{1-4}alkyl)_2$ and $-C_2H_4CO_2C_{1-4}$alkyl; A is a coupling component selected from: a 5- or 6-membered heterocycle consisting of 5-aminopyrazole, 5-pyrazolone, barbituric acid, 6-hydroxypyrid-2-one, 4-hydroxycoumarin and 1,2-dialkylindole; a 1- or 2-naphthol group and an aromatic amine of the formula

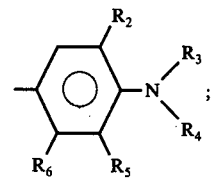

W is 1,4-naphthylene or

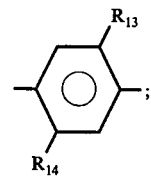

$R_2$ is H, F, Cl, $C_{1-4}$alkyl, $OC_{1-4}$alkyl; $R_3$ is cyclohexyl or $C_{1-14}$alkylene-$R_9$; $R_2$ and $R_3$ together with the nitrogen atom optionally form a 6-membered ring optionally substituted with $-OH$, $OC_2H_4CN$ or $OCOC_{1-5}$alkyl; $R_4$ is H,

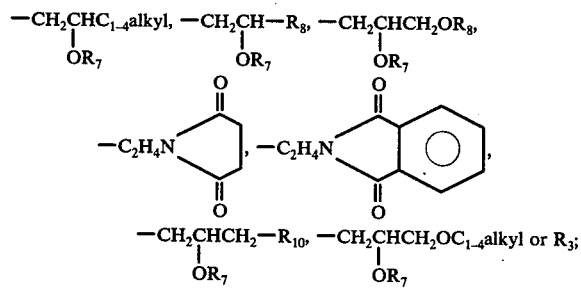

$R_3$ and $R_4$ together optionally form a 6-membered heterocyclic ring containing the nitrogen atom; $R_5$ is H; $R_6$ is H, F, Cl, Br, $C_{1-4}$alkyl, $OC_{1-4}$alkyl, OH, $C_{1-4}$hydroxyalkyl, $NHCOCH=CH_2$, $NHCOC_{1-4}$alkyl, $NHCOR_8$, $NHCO_2C_{1-4}$alkyl, $NHCONHC_{1-4}$alkyl, $NHSO_2C_{1-4}$alkyl, $NHSO_2R_8$, $NHCO_2R_8$, $NHCONHR_8$, $NHCOC_{1-4}$alkylene-$R_{10}$, $NHCOC_{1-4}$alkylene-$OC_{1-4}$alkylene-$R_{10}$, $NHCO_2C_{1-4}$alkyleneOC$_{1-4}$alkyl; $R_5$ and $R_6$ together optionally form $-CH=CH-CH=CH-$; $R_7$ is H or $C_{1-4}$acyl; $R_8$ is phenyl or phenyl optionally substituted with 1-2 groups selected from Cl, Br, CN, CF$_3$, NO$_2$, $C_{1-4}$alkyl, $OC_{1-4}$alkyl, $N(C_{1-4}alkyl)_2$ and $NHCOC_{1-4}$alkyl; $R_9$ is H, OH, CN, $COC_{1-4}$alkyl, $OCOCH=CH_2$, $OCOC_{1-4}$alkylene-$R_{11}$, $OCOR_8$, $CO_2R_8$, $CO_2C_{1-4}$alkylene-$R_{12}$,

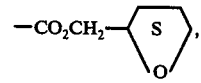

$OC_{1-4}$alkylene-$R_{10}$, $CONHC_{1-4}$alkylene-$R_{11}$, $SO_2R_8$, $OCONHC_{1-4}$alkylene-$R_{10}$, $NHCOC_{1-4}$alkylene-$R_{10}$, $NHCONHR_8$, $NHCOR_8$ or $R_8$; $R_{10}$ is CN, OH, Cl, Br or $R_7$; $R_{11}$ is H, Cl, Br, $OC_{1-4}$alkyl or phenyl; $R_{12}$ is H, OH, $OC_{1-4}$alkyl, $OCOC_{1-4}$alkylene-$R_{11}$or $OCOR_8$; $R_{13}$ and $R_{14}$ are independently H, $C_{1-4}$alkyl, $C_{1-4}$alkoxy or Cl; $m$ is 0 or 1; and $n$ is 1 to 3.

23 Claims, No Drawings

DISPERSE MONO- AND BISAZO DYES DERIVED FROM 2-AMINO-4,5-DICYANOIMIDAZOLE

BACKGROUND AND OBJECTS OF THE INVENTION

The dye trade is continuously seeking new and better dyes for use in existing dyeing and printing systems, newly developed systems and with different fibers, which materials may, for example, be subjected to an aftertreatment (after dyeing) step, such as the application of a permanent press resin composition, to impart an additional disirable property to the dyed fiber.

In addition, dyes which combine brightness of shade and high tinctorial strength with good application and fastness properties are particularly useful in such systems. Bright dyes are more attractive than dull dyes and offer greater versatility in formulating mixed shades. Commercial disperse dyes for use on polyester and other synthetic and semisynthetic fibers tend as a class to have rather dull shades. Bright disperse dyes often suffer from poor lightfastness or high cost, or both.

Heterocylic azo dyes are valued for their brightness and tinctorial strength. However, few have reached commercial importance, often because of poor fastness properties or lack of economical synthetic procedures for their manufacture.

It is an object of this invention to provide yellow to blue shade disperse dyes. It is a further object to provide bright, tinctorially strong disperse dyes. It is a still further object to provide disperse dyes with good to excellent fastness to light and sublimation on polyester and polyester-cellulosic blend fibers. These and other objects are fulfilled by the following invention.

SUMMARY OF THE INVENTION

The present invention is concerned with azo dyes free of water solubilizing groups, which have the formula

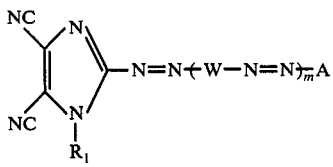

wherein $R_1$ is selected from the group consisting of $C_{1-4}$alkyl, —CH$_2$—CH=CH$_2$,

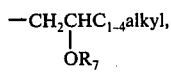

—(CH$_2$)$_n$R$_8$, $C_{1-4}$ alkyleneCN, $C_2H_4OR_7$, —CH$_2$—CH=CH-R$_8$, —C$_2$H$_4$CONH$_2$, —C$_2$H$_4$CONHC$_{1-4}$alkyl, —C$_2$H$_4$CON(C$_{1-4}$alkyl)$_2$, and —C$_2$H$_4$CO$_2$C$_{1-4}$—alkyl, A is selected from the group consisting of a heterocycle, a naphthol coupler, and an amine of the formula

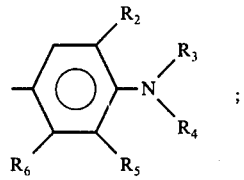

W is 1,4-naphthylene or

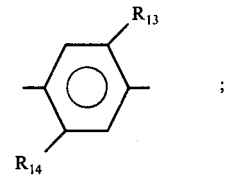

$R_2$ is H, F, Cl, $C_{1-4}$alkyl, $OC_{1-4}$alkyl; $R_3$ is cyclohexyl or $C_{1-4}$alkylene-R$_9$; or $R_2$ and $R_3$ together can form a 6-membered ring optionally substituted with —OH, $OC_2H_4CN$ or $OCOC_{1-5}$alkyl; $R_4$ is H,

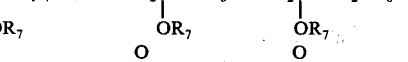

or $R_3$ and $R_4$ together form a heterocyclic ring containing the nitrogen atom; $R_5$ is H; $R_6$ is H, F, Cl, Br, $C_{1-4}$alkyl, $OC_{1-4}$alkyl, OH, $C_{1-4}$hydroxyalkyl, NHCOCH=CH$_2$, NHCOC$_{1-4}$alkyl, NHCOR$_8$, NHCO$_2$C$_{1-4}$alkyl, NHCONHC$_{1-4}$alkyl, NHSO$_2$C$_{1-4}$alkyl, NHSO$_2$R$_8$, NHCO$_2$R$_8$, NHCONHR$_8$, NHCOC$_{1-4}$alylene-R$_{10}$, NHCOC$_{1-4}$alkylene-OC$_{1-4}$alkylene-R$_{10}$, NHCO$_2$C$_{1-4}$alkyleneOC$_{1-4}$alkyl; or $R_5$ and $R_6$ together are -CH=CH-CH=CH-; $R_7$ is H or $C_{1-4}$acyl; $R_8$ is phenyl or phenyl optionally substituted with 1-2 groups selected from Cl, Br, CN, CF$_3$, NO$_2$, $C_{1-4}$alkyl, $OC_{1-4}$alkyl, N(C$_{1-4}$alkyl)$_2$ and NHCOC$_{1-4}$alkyl; $R_9$ is H, OH, CN, COC$_{1-4}$-alkyl, OCOCH=CH$_2$, OCOC$_{1-4}$alkylene-R$_{11}$, OCOR$_8$, CO$_2$R$_8$, CO$_2$C$_{1-4}$alkylene-R$_{12}$,

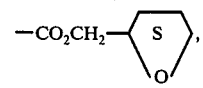

OC$_{1-4}$alylene-R$_{10}$, CONHC$_{1-4}$alkylene-R$_{11}$, SO$_2$R$_8$, OCONHC$_{1-4}$alkylene-R$_{10}$, NHCOC$_{1-4}$-alkylene-R$_{10}$, NHCONHR$_8$, NHCOR$_8$ or R$_8$; R$_{10}$ is CN, OH, Cl, Br or R$_7$; R$_{11}$ is H, Cl, Br, OC$_{1-4}$alyl or phenyl; R$_{12}$ is H, OH, OC$_{1-4}$alkyl, OCOC$_{1-4}$alkylene-R$_{11}$ or OCOR$_8$; R$_{13}$ and R$_{14}$ are independently H, C$_{1-4}$alkyl, C$_{1-4}$alkoxy or Cl; m is 0 or 1 and n is 1 to 3.

The present invention also relates to the process for preparing the heretofore defined mono- and bisazo dyes, said process consisting of first diazotizing 2-amino-4,5-dicyanoimidazole by conventional means and subsequently coupling to compounds defined by A above to provide the intermediate monoazo compounds of the following generic structure:

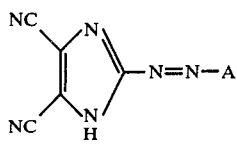

Coupling of 2-diazo-4,5-dicyanoimidazole to α-naphthylamine or an amine of the formula

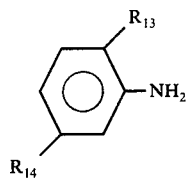

where $R_{13}$ and $R_{14}$ are as previously defined above, provides an intermediate monoazo amine which is subsequently diazotized and coupled to compounds defined by A above to yield the intermediate bisazo compounds of the following generic structure

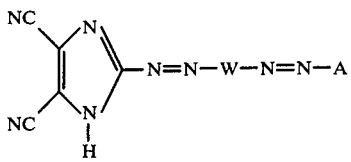

where W and A are as previously defined.

In a subsequent step, the above intermediate mono- and bisazo compounds are alkylated on one of the imidazole nitrogens as hereinafter described to introduce the $R_1$ radical, thus providing the dyes of the present invention having the following generic structure

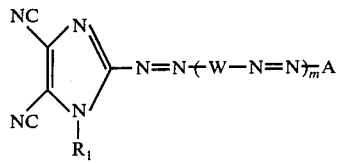

where $R_1$, W, A and m are as previously defined.

The preparation of 2-amino-4,5-dicyanimidazole was carried out essentially as described by Webster in coassigned patent application Ser. No. 146,754 by treatment of diaminomaleonitrile with a 10% molar excess of cyanogen chloride in tetrahydrofuran solvent at 25°–30° C.

The diazotization of 2-amino-4,5-dicyanoimidazole can be carried out at from 8° to 25° C., with a range of 20°–25° C. being most convenient, by the action of sodium nitrite in aqueous mineral acid, e.g. HCl. The 2-diazo-4,5-dicyanoimidazole precipitates quantitatively and can be filtered off and dried under an air stream or in a vacuum. However, dry 2-diazo-4,5-dicyanoimidazole is highly shock sensitive and detonates at 150° C. In order to avoid explosions, the water-wet suspension of the diazonium zwitterion is preferably used directly in the subsequent coupling step.

Coupling to aromatic amines to provide the intermediate monoazo compounds of this invention is carried out by dissolving the amine coupler (defined by A) in a suitable solvent, which in some cases can be aqueous mineral acid and/or aqueous acetic acid but more usually is a solvent such as methanol, ethanol or a mixture of one of these and acetic acid, and then slowly adding the coupler solution to the diazonium zwitterion slurry, or vice versa. Equimolar proportions or up to a 10% molar excess of coupler to 2-amino-4,5-dicyanoimidazole are operable. A 10% molar excess of coupler is particularly perferred. Coupling temperatures in the range from 8° to 25° C. are operable and 20°–25° C. is preferred for convenience. Time for the coupling reaction may vary from a few minutes (e.g. 5) up to 24 hours, depending somewhat on the temperature and the reactivity of the coupler employed. Aqueous sodium acetate may be added at this point, in some cases, to neutralize the strong mineral acid and raise the pH to 3.0–4.0 in order to obtain complete coupling. Addition of sodium acetate can also help to coagulate the dye and provide a better filtering crystal form even when coupling is complete at low mineral acid pH. The dye product is insoluble and readily precipitates even prior to the sodium acetate addition. The dye is then isolated by filtration, washed with water and dried.

The intermediate bisazo compounds of this invention are prepared by coupling 2-diazo-4,5-dicyanoimidazole to 2-naphthylamine or an amine of the formula

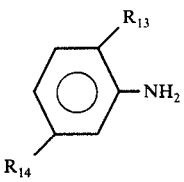

where $R_{13}$ and $R_{14}$ are as previously defined. Table I lists examples of such amines.

TABLE I aniline
o- or m-toluidine
o- or m-ethylaniline
o- or m-anisidine
o- or m-phenetidine
o- or m-chloroaniline
2,5-xylidine
2,5-dimethoxyaniline
2,5-diethoxyaniline
5-chloro-o-toluidine
5-chloro-o-anisidine
5-methyl-o-anisidine Coupling is preferably effected at 20°–25° C. by dissolving the amine totally or partially in dilute mineral acid and/or an organic solvent such as acetic acid and/or methanol and then slowly adding the diazonium zwitterion preparation, or vice versa. When the coupling is complete, the reaction mixture is advantageously neutralized with caustic and the monoazo product is isolated by filtration.

The monoazo amine thus obtained is conveniently diazotized in aqueous acetic acid by adding hydrochloric acid and sodium nitrite at 10°–25° C., preferably at 20°–25° C., and coupled to the final coupling component as defined by A by an identical procedure to that described above.

Substituted aniline couplers useful in the practice of this invention are given in Table II.

Table II

Substituted Aniline Couplers Useful in the Practice of this Invention

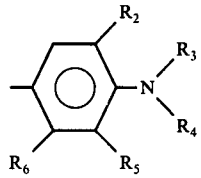

| $R_2$ | $R_3$ | $R_4$ | $R_5$ | $R_6$ |
|---|---|---|---|---|
| H | $C_2H_4OCOCH_3$ | $C_2H_4OCOCH_3$ | H | $NHCOCH_3$ |
| H | $C_2H_5$ | $CH_2CH(OH)CH_2OC_6H_5$ | H | $CH_3$ |
| H | $CH_3$ | $CH_3$ | H | $NHCOC_6H_5$ |
| H | $C_2H_4CO_2CH_3$ | $C_2H_4CO_2CH_3$ | H | $NHCOCH_3$ |
| H | $C_2H_5$ | $C_2H_4CO_2CH_3$ | H | $NHCOCH_3$ |
| H | $C_2H_5$ | $C_2H_5$ | H | $NHCOCH_3$ |
| H | $CH_2C_6H_5$ | $CH_2C_6H_5$ | H | $NHCOCH_3$ |
| H | $(CH_2)_3CH_3$ | $(CH_2)_3CH_3$ | H | $NHCOCH_3$ |
| H | $C_2H_5$ | $CH_2C_6H_5$ | H | $NHCOCH_3$ |
| H | $C_2H_5$ | $CH_2CH(OH)CH_2CH_3$ | H | $NHCOCH_3$ |
| H | $C_2H_5$ | $C_2H_5$ | H | $CH_3$ |
| H | $C_2H_5$ | $C_2H_4OH$ | H | $CH_3$ |
| $OCH_3$ | $C_2H_4CN$ | H | H | $NHCOCH_3$ |
| $OCH_3$ | $C_2H_5$ | $C_2H_5$ | H | $NHCOCH_3$ |
| $OCH_3$ | $C_2H_4CN$ | $C_2H_4OCOCH_3$ | H | $NHCOCH_3$ |
| H | $C_2H_5$ | $C_2H_4CN$ | H | $CH_3$ |
| —$CH_2CH(OC_2H_4CN)CH_2$— | | $C_2H_5$ | H | $CH_3$ |
| H | $C_2H_4CN$ | $C_2H_4OH$ | H | $CH_3$ |
| H | $C_2H_4CN$ | $C_2H_4OCOCH_3$ | H | $CH_3$ |
| H | $CH(CH_3)_2$ | $CH_2CH(OCOCH_3)C_2H_5$ | H | $NHCOCH_3$ |
| H | $C_2H_4CN$ | $CH_2CH(OCOCH_3)C_2H_5$ | H | $NHCOCH_3$ |
| H | $C_2H_4CN$ | $C_2H_4OH$ | H | $NHCOCH_3$ |
| H | $C_2H_4CN$ | $CH_2CH(OH)C_2H_5$ | H | $NHCOCH_3$ |
| H | $C_2H_5$ | $C_2H_5$ | H | H |
| H | $(CH_2)_3CH_3$ | $(CH_2)_3CH_3$ | H | H |
| H | $CH(CH_3)CH_2CN$ | H | H | H |
| H | $C_2H_4CN$ | $CH_2CH_2CH_3$ | H | H |
| H | $C_2H_4CN$ | $C_2H_4CN$ | H | H |
| H | $C_2H_4OH$ | $C_2H_4OH$ | H | H |
| H | $C_2H_4CN$ | $C_2H_4OCOC_6H_5$ | H | H |
| H | $C_2H_4OCOC_3H_7$ | $C_2H_4OCOC_3H_7$ | H | H |
| H | $C_2H_4CN$ | $C_2H_4C_6H_5$ | H | H |
| H | $C_2H_4OCO(CH_2)_3CH_3$ | $C_2H_4OCO(CH_2)_3CH_3$ | H | H |
| H | $C_2H_4OCOCH=CH_2$ | $C_2H_4CN$ | H | Cl |
| H | $C_2H_4CO_2(CH_2)_3CH_3$ | H | H | Cl |
| H | $C_2H_4CN$ | $C_2H_4CN$ | H | Br |
| H | $C_2H_4CN$ | $C_2H_4OH$ | H | $C_4H_9$ |
| H | $CH_3$ | $CH_3$ | H | $NHCOC(CH_3)_3$ |
| H | $C_2H_4OCOCH_3$ | $C_2H_4OCOCH_3$ | H | $NHSO_2CH_3$ |
| H | $C_2H_5$ | $C_2H_5$ | H | $NHCONHC_2H_5$ |
| H | $C_2H_5$ | $C_2H_5$ | H | $NHCO_2CH_3$ |
| H | $C_2H_5$ | $C_2H_5$ | H | $NHCOC_3H_7$ |
| H | $C_2H_5$ | $C_2H_5$ | H | $NHCONHC_4H_9$ |
| H | $C_2H_5$ | $C_2H_5$ | H | $NHCO_2C_4H_9$ |
| H | $C_2H_5$ | $C_2H_5$ | H | $NHCO_2C_2H_4OC_2H_5$ |
| H | $C_2H_5$ | $C_2H_5$ | H | $NHCO_2C_2H_5$ |
| H | $C_2H_5$ | $C_2H_5$ | H | $NHCOCH_2OC_2H_5$ |
| H | $C_2H_5$ | $C_2H_5$ | H | $NHCOCH_2Cl$ |
| H | $C_2H_5$ | $C_2H_5$ | H | $NHSO_2CH_3$ |
| H | $C_2H_4OCOC_2H_5$ | $C_2H_4OCOC_2H_5$ | H | $NHCOC_2H_5$ |
| H | $C_2H_4OCOC_3H_7$ | $C_2H_4OCOC_3H_7$ | H | $NHCOC_3H_7$ |
| H | $C_2H_5$ | $CH_2C_6H_5$ | H | $CH_3$ |
| H | $C_2H_5$ | $CH_2CH(OH)C_2H_5$ | H | $CH_3$ |
| H | $C_2H_5$ | $C_2H_5$ | H | $CH(OH)CH_3$ |
| H | $C_2H_5$ | $C_2H_4CO_2CH_3$ | H | $CH_3$ |
| H | $C_2H_5$ | $C_2H_5$ | H | OH |
| H | $C_2H_4OH$ | $C_2H_4OH$ | H | $CH_3$ |
| H | $C_2H_4CO_2C_2H_4OC_2H_5$ | H | H | $NHCOCH_3$ |
| H | $C_2H_4CO_2C_6H_4$-(3')$N(CH_3)_2$ | H | H | H |
| H | $C_2H_4CO_2C_6H_4$-(3')$CF_3$ | $C_2H_5$ | H | H |
| H | $C_2H_4CO_2C_6H_3$-(3',5')$(Cl_2)$ | $C_2H_4CN$ | H | H |
| H | $C_2H_4CO_2C_6H_4$-(4')$OCH_3$ | $C_2H_5$ | H | $NHCOCH_3$ |
| H | $C_2H_4CO_2C_6H_3$-(4')$OCH_3$,(2')$CH_3$ | $C_2H_5$ | H | $NHCOCH_3$ |
| H | $CH_2CH(CH_3)CO_2C_6H_4$-(4')$C(CH_3)_3$ | H | H | $CH_3$ |
| H | $C_2H_4OCOC_6H_4$-(2')Cl | $C_2H_5$ | H | $NHCOCH_3$ |
| H | $C_2H_4OCOC_6H_4$-(4')$NO_2$ | $C_2H_5$ | H | $CH_3$ |
| H | $C_2H_4OCOC_6H_4$-(4')$NHCOCH_3$ | $C_2H_4CN$ | H | H |
| H | $C_2H_4OCOC_6H_3$-(2')Cl, (4')$NO_2$ | $C_2H_5$ | H | $NHCOC_2H_5$ |
| H | $C_2H_4OCOCH_2CH(C_6H_5)CH_3$ | $C_2H_4CN$ | H | H |
| H | $C_2H_4CO_2C_2H_4OCOC_6H_3$-(2')$CH_3$, (3')$NO_2$ | $C_2H_5$ | H | $NHCOCH_3$ |
| H | $CH_2CH_2CH_2OCOC_6H_4$-(4')Br | $C_2H_5$ | H | H |
| H | $CH_2CH(CH_3)CO_2C_2H_4OCOC_6H_4$-(4')$OCH_3$ | $C_2H_5$ | H | H |
| H | $C_2H_4CO_2C_2H_4OCOC_6H_4$-(3')CN | $C_2H_5$ | H | $NHCOCH_3$ |
| H | $C_2H_4CO_2C_2H_4OCOC_6H_4$-(2')$CH_3$ | H | H | H |
| H | $C_2H_4CO_2C_2H_4OCOC_2H_4C_6H_5$ | H | H | $NHCOCH_3$ |
| H | $C_2H_4CO_2C_2H_4OCOCH_2Cl$ | $C_2H_5$ | H | $NHCOC_2H_5$ |
| H | $C_2H_4CO_2C_2H_4OC_3H_7$ | H | H | Cl |
| H | $CH(CH_3)CH(CH_3)CO_2C_2H_4OC_2H_5$ | H | H | $CH_3$ |
| H | $C_2H_4CO_2CH_2CH(OCH_3)CH_3$ | $C_2H_5$ | H | Br |
| H | $C_2H_4CO_2CH_2CH_2CH_2OH$ | $C_2H_5$ | H | $CH_3$ |
| H | $CH_2CH(CH_3)CO_2CH_2CHCH_2CH_2CH_2O$ | $C_2H_5$ | H | H |

Table II-continued

Substituted Aniline Couplers Useful in the Practice of this Invention

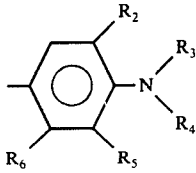

| $R_2$ | $R_3$ | $R_4$ | $R_5$ | $R_6$ |
|---|---|---|---|---|
| F | $C_2H_4OCOC_2H_5$ | $C_2H_4CN$ | H | H |
| H | $C_2H_4CO_2C_2H_4OCOC_3H_7$ | $C_2H_4CO_2C_2H_4OCOC_3H_7$ | H | H |
| $C_4H_9$ | $C_2H_5$ | $C_2H_4CN$ | H | Cl |
| Cl | $C_2H_4OCOC_2H_4OCH_3$ | $C_2H_4CN$ | H | H |
| $OC_4H_9$ | $C_2H_4OCOCH_3$ | $C_2H_4OCOCH_3$ | H | H |
| H | $C_2H_5$ | $CH_2CH_2CH_2CN$ | H | F |
| H | $C_2H_5$ | $C_2H_5$ | H | $NHCOC_2H_4OCH_3$ |
| H | $C_2H_4CN$ | $C_2H_4CO_2CH_3$ | H | $NHCO(CH_3)_3CH_3$ |
| H | $CH_2CH_2CH_3$ | $C_2H_4C_6H_5$ | H | $NHCOC_2H_4Cl$ |
| $OCH_3$ | $C_2H_5$ | $C_2H_4CO_2CH_3$ | H | $NHCOCH_3$ |
| $OC_2H_5$ | $C_2H_4CO_2C_2H_4OH$ | H | H | $NHCOCH_3$ |
| $OCH_3$ | $C_2H_5$ | $C_2H_5$ | H | $NHCOC_6H_4-(3')CH_3$ |
| $OCH_3$ | $C_2H_5$ | $C_2H_5$ | H | $NHCOCH_2Cl$ |
| $OCH_3$ | $C_2H_4OH$ | $C_2H_4OH$ | H | $NHCOCH_2CH(Cl)CH_3$ |
| $OCH_3$ | $C_2H_4CO_2C_2H_4OCOCH_3$ | $C_2H_4CO_2C_2H_4OCOCH_3$ | H | $NHCOCH_3$ |
| $OCH_3$ | $C_2H_4OCOCH_3$ | $C_2H_4OCOCH_3$ | H | $NHCOC_6H_4-(2')Cl$ |
| $OCH_3$ | $C_2H_4CN$ | $C_2H_4OCOCH_3$ | H | $NHCO(CH_2)_3CH_2Br$ |
| $OCH_3$ | $C_2H_4OH$ | $C_2H_4CO_2CH_3$ | H | $NHCOCH_3$ |
| $OCH_3$ | $C_2H_4OH$ | $C_2H_4CN$ | H | $NHCOC_6H_4-(4')NO_2$ |
| —$CH_2CH(OH)CH_2$— | | H | —CH=CH—CH=CH— | |
| —$CH_2CH(OCOC_5H_{11})CH_2$— | | H | —CH=CH—CH=CH— | |
| H | $C_2H_4CO_2CH_2$—CH—$CH_2CH_2CH_2O$ | H | —CH=CH—CH=CH— | |
| H | $C_2H_5$ | H | —CH=CH—CH=CH— | |
| H | $C_2H_5$ | $C_2H_5$ | —CH=CH—CH=CH— | |
| $OCH_3$ | $C_2H_5$ | $C_2H_5$ | —CH=CH—CH=CH— | |
| H | $C_2H_4CONHCH_3$ | H | —CH=CH—CH=CH— | |
| H | $C_2H_4CN$ | H | —CH=CH—CH=CH— | |
| H | $C_2H_4C$ | $CH_2CH(OH)CH_2Cl$ | H | $CH_3$ |
| H | $C_2H_4CN$ | $CH_2CH(OCOCH_3)CH_2Cl$ | H | H |
| H | $C_2H_4CN$ | $CH_2CH(OCOC_4H_9)CH_2Br$ | H | Cl |
| H | $C_2H_4CN$ | $CH_2CH(OCOCH_3)CH_2Cl$ | H | $NHCOCH_3$ |
| H | $C_2H_4CN$ | $CH_2CH(OH)CH_2Cl$ | H | $NHCOCH_3$ |
| $OCH_3$ | $C_2H_4CN$ | $CH_2CH(OCOCH_3)CH_2Cl$ | H | $NHCOCH_3$ |
| H | $C_2H_4CN$ | $CH_2CH(OCOCH_3)CH_2OC_6H_5$ | H | Cl |
| H | $C_2H_4CN$ | $CH_2CH(OCOCH_3)CH_2OC_6H_4-(4')CH_3$ | H | $CH_3$ |
| H | $C_2H_4CN$ | $CH_2CH(OCOCH_3)CH_2OC_6H_4-(4')OCH_3$ | H | $CH_3$ |
| H | $C_2H_4CN$ | $CH_2CH(OCOC_2H_5)CH_2OC_6H_5$ | H | $NHCOCH_3$ |
| H | $C_2H_4CN$ | $CH_2CH(OCOC_2H_5)CH_2OC_2H_5$ | H | $NHCOCH_3$ |
| H | $C_2H_4CN$ | $CH_2CH(OCOCH_3)CH_2OC_4H_9$ | 4 | $NHCOCH_3$ |
| H | $C_2H_5$ | $C_2H_5$ | H | $OCH_3$ |
| H | $C_2H_4CN$ | $C_2H_4OCOCH_3$ | H | $OC_2H_5$ |
| H | $C_2H_4CN$ | $C_2H_5$ | H | $NHCOCH=CH_2$ |
| H | $C_2H_4OCOCH_3$ | $C_2H_4OCOCH_3$ | H | $NHCOC_6H_5$ |
| H | $C_2H_4OCOCH_3$ | $C_2H_4OCOCH_3$ | H | $NHSO_2C_2H_5$ |
| H | $C_2H_4OCOCH_3$ | $C_2H_4OCOCH_3$ | H | $NHSO_2C_6H_5$ |
| H | $C_2H_4CN$ | $C_2H_5$ | H | $NHSO_2C_6H_4-(4')CH_3$ |
| H | $C_2H_5$ | $C_2H_5$ | H | $NHCO_2C_6H_4-(4')CH_3$ |
| H | $C_2H_4CN$ | $C_2H_5$ | H | $NHCO_2C_6H_4-(4')Br$ |
| H | $C_2H_5$ | $C_2H_5$ | H | $NHCONHC_6H_5$ |
| H | $C_2H_5$ | $C_2H_5$ | H | $NHCONHC_6H_4-(4')Cl$ |
| H | $C_2H_5$ | $C_2H_5$ | H | $NHCO_2C_2H_4OC_4H_9$ |
| H | $C_2H_4COC_2H_5$ | $C_2H_4COC_2H_5$ | H | $NHCOCH_3$ |
| H | $C_2H_4OCOC_2H_4Br$ | $C_2H_5$ | H | $NHCOCH_3$ |
| H | $C_2H_4OCOCH_2CH_2CH_2Cl$ | $C_2H_4CN$ | H | H |
| H | $C_2H_4OCOC_2H_4OC_2H_5$ | $C_2H_4OCOC_2H_4OC_2H_5$ | H | $NHCOCH_3$ |
| H | $C_2H_4CO_2C_2H_4OCH_3$ | $C_2H_4CO_2C_2H_4OCH_3$ | H | $NHCOCH_3$ |
| H | $C_2H_4CO_2C_2H_4OH$ | $C_2H_4CO_2C_2H_4OH$ | H | $NHCOCH_3$ |
| H | $C_2H_4CONHC_2H_4Cl$ | $C_2H_5$ | H | $NHCOCH_3$ |
| H | $C_2H_4CONHCH_2CH_2CH_2Cl$ | $C_2H_4CONHCH_2CH_2CH_2Cl$ | H | $NHCOCH_3$ |
| H | $C_2H_4SO_2C_6H_5$ | $C_2H_5$ | H | H |
| H | $C_2H_4SO_2C_6H_4-(4')CH_3$ | H | H | $NHCOCH_3$ |
| H | $C_2H_4SO_2C_6H_5$ | $C_2H_4SO_2C_6H_5$ | H | $NHCOCH_3$ |
| H | $C_2H_5$ | 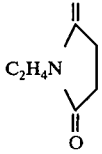 $C_2H_4N$ | H | $NHCOCH_3$ |

Table II-continued

Substituted Aniline Couplers Useful in the Practice of this Invention

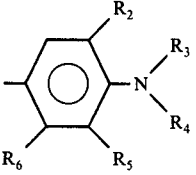

| $R_2$ | $R_3$ | $R_4$ | $R_5$ | $R_6$ |
|---|---|---|---|---|
| H | $C_2H_4CN$ | 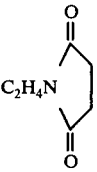 | H | $CH_3$ |
| H | $C_2H_4CONHC_2H_4OCH_3$ | $C_2H_4CONHC_2H_4OCH_3$ | H | $NHCOCH_3$ |
| H | $-CHCH_2CH_2CH_2CH_2-$ | H | H | $CH_3$ |
| H | $-CHCH_2CH_2CH_2CH_2-$ | H | H | $NHCCH_3$ ‖ O |
| $OCH_3$ | $-CHCH_2CH_2CH_2CH_2-$ | H | H | $NHCCH_3$ ‖ O |
| H | $C_2H_5$ | $CH_2CH(OH)C_6H_5$ | H | H |
| H | $C_2H_5$ | $CH_2CH(OH)CH_2Cl$ | H | $CH_3$ |
| H | $C_2H_5$ | $C_2H_5$ | H | Cl |
| H | $C_2H_5$ | $C_2H_5$ | H | $NHCOC_2H_5$ |
| H | $CH_3$ | $CH_3$ | H | $NHCOCH_3$ |
| H | $C_2H_5$ | $C_2H_5$ | H | $NHCOC(CH_3)_3$ |
| H | $C_2H_5$ | $CH_2CH(OH)CH_2CN$ | H | $CH_3$ |
| H | $C_2H_5$ | $CH_2C_6H_4-(3')NO_2$ | H | $CH_3$ |
| H | $C_2H_5$ | $CH_2C_6H_4-(4')Cl$ | H | $CH_3$ |

Many of the aforementioned aniline couplers can be obtained by methods well-known in the art, e.g. in British Pat. Nos. 1,297,057, 1,244,978, 1,290,901, U.S. Pat. No. 3,639,385 and 3,639,384.

Coupling of 2-diazo-4,5-dicyanoimidazole to naphthol couplers is conveniently carried out by adding a suspension of the diazo compound in an aqueous acidic medium to a solution of the coupling component in water and/or a water-soluble organic liquid containing an alkali metal hydroxide or carbonate, if necessary, adjusting the pH of the mixture to effect coupling and thereafter isolating the dyestuff by filtration. Suitable organic liquids include ethanol, 2-ethoxyethanol, dimethylsulfoxide, and the lie. Time for the coupling reaction may vary from a few minutes (e.g. 5) up to 24 hours, depending on the temperature, pH and the reactivity of the coupler employed. Coupling temperatures in the range from 0° to 25° C. are operable and 20°-25° C. is preferred for convenience. Coupling facilely occurs at pH values above 7 and especially at 9-12.

If a represents a naphthol radical, it can be unsubstituted as well as substituted by halogens such as chlorine or bromine; sulfonic acid amide groups substituted at the nitrogen by lower alkyl groups; lower alkylsulfonyl or arylsulfonyl groups; lower alkylcarbonylamino groups; lower alkoxycarbonyl groups and lower alkylcarbamoyl groups where lower alkyl and alkoxy denote from 1 to 4 carbons.

Examples of naphthol couplers useful in the practice of this invention are given in Table III.

TABLE III

Naphthol Couplers Useful in the Practice of this Invention 6-bromo-2-naphthol
4-chloro-1-naphthol
2-chloro-1-naphthol
1-naphthol
2-naphthol
1-acetylamino-7-naphthol
3-methoxycarbonyl-2-naphthol
3-ethoxycarbonyl-2-naphthol
6-[N,N-bis(ethyl)sulfamoyl]-2-naphthol
6-[N-(sec.-butyl)sulfamoyl]-2-naphthol
6-phenylsulfonyl-2-naphthol
7-phenylsulfonyl-2-naphthol
7-ethylsulfonyl-2-naphthol
6-[N,N-bis(n-butyl)sulfamoyl]-2-naphthol
6-n-butylsulfonyl-2-naphthol
3-t-butylcarbamoyl-2-naphthol
3-ethylcarbamoyl-2-naphthol If A is a heterocycle radical, then it is mainly the radical of a 5- or 6-membered heterocycle, particularly one containing nitrogen or oxygen. Preferably A is a radical of the aminopyrazole, pyrazolone, barbituric acid, pyridone, indole or hydroxy coumarin series.

More specifically, A can be a 5-aminopyrazole additionally containing in the 1-position a phenyl or benzyl group, optionally substituted by lower alkyl, lower aloxy, lower alkylsulfonyl, Cl, Br, CN, lower alkylcarbonylamino, lower alkylsulfonamido or sulfonic acid aryl ester groups.

In addition, A can be a 5-pyrazolone containing in the 1-position a lower alkyl or aralkyl group optionally substituted by CN or OH; or a phenyl group, optionally substituted by Cl, $NO_2$, lower alkyl, lower alkoxy, lower alkylcarbonylamino, lower alkylsulfonyl or lower alkylsulfonamido.

The radical A can also be a barbituric acid optionally substituted in either the 1- and/or 3-positions by lower alkyl groups which may be further substituted by hydroxy, lower aloxy, lower alylcarbonyloxy, CN and halogens such as chlorine or bromine; cycloalkyl groups such as cyclohexyl; aralkyl groups such as benzyl and β-phenylethyl; or phenyl groups optionally substituted by Cl, Br, CN, NO$_2$, CF$_3$, lower alkylcarbonyl, lower alkylsulfonyl or arylsulfonyl, lower alkylcarbonyloxy, lower alkyl sulfonamido or lower alkylcarbonylamino.

The radical A can also be a 3-cyano-4-methyl-6-hydroxy-pyrid-2-one substituted in the 1-position by a lower alkyl group which can be optionally substituted by hydroxy, lower alkoxy, lower alkylcarbonyloxy; or lower aralkyl such as benzyl or β-phenylethyl; or by phenyl or phenyl substituted by lower alkyl, lower alkoxy or Cl.

Finally, the radical A can also denote a 4-hydroxy coumarin radical which may be optionally substituted in the 6-position by lower alkyl; lower alkoxy; or halogen; or disubstituted in the 5,6- or 6,7-positions by lower alkyl.

The term "lower" used in the above discussion in connection with alkyl and alkoxy means that these radicals contain from 1 to 6 carbon atoms.

Coupling of diazotized 2-amino-4,5-dicyanoimidazole with heterocyclic coupling components is carried out preferably in an aqueous or aqueous organic medium under weakly acid, neutral or weakly alkaline conditions, for exmple, in the pH range of 3.5 (acetate buffer) to 9.5 (carbonate/bicarbonate buffer) and at temperatures of 0° to about 30° C. with a range of 0°–10° C. being preferred.

Examples of heterocyclic couplers that can be used in the practice of this invention are given in Table IV. The heterocyclic couplers can be obtained by methods wellnown in the art, e.g., 5-aminopyrazoles in U.S. Pat. Nos. 3,471,468, 3,356,673 and 3,639,387; 5-pyrazolones in U.S. Pat. Nos. 3,395,138 and 3,206,453; 1,3-disubstituted barbituric acids in U.S. Pat. Nos. 3,341,512 and 3,377,129; 3-cyano-4-methyl-6-hydroxy-pyrid-2ones in U.S. Pat. No. 3,640,674; and 4-hydroxy coumarins in U.S. Pat. No. 3,344,132.

The intermediate mono- and bisazo compounds prepared as previously described above are subsequently reacted with suitable alkylating agents to introduce the R$_1$ radical and thus provide the novel dyestuffs of the present invention.

TABLE IV

Heterocyclic Couplers Useful in the Practice of This Invention 1-phenyl-3-methyl-5-aminopyrazole
1-(2'-,3'- or 4'-methylphenyl)-3-methyl-5-aminopyrazole
1-(2'-,3'- or 4'-methoxyphenyl)-3-methyl-5-aminopyrazole
1-(2' or 4'-chlorophenyl)-3-methyl-5aminopyrazole
1-(2'-,4'-dichlorophenyl)-3-methyl-5-aminopyrazole
1-(3'- or 4'-acetylaminophenyl)-3-methyl-5-aminopyrazole
1-benzyl-3-methyl-5-aminopyrazole
1-(3'- or 4'-methylsulfonamidophenyl)-3-methyl-5-aminopyrazole
1-phenyl-3-ethoxy-5-aminopyrazole
1-(4'-methoxyphenyl)-3-methoxy-5-aminopyrazole
1-phenyl-3-methoxycarbonyl-5aminopyrazole
1-phenyl-3-methoxy-5-aminopyrazole
1-(4'-chlorophenyl)-3-methoxy-5aminopyrazole
1-(4'-chlorophenyl)-3-ethoxycarbonyl-5-aminopyrazole
1-(4'-bromophenyl)-3-methoxy-5-aminopyrazole
1(4'-methylsulfonylphenyl)-3-methoxy-5-aminopyrazole
1-(4'-ethylsulfonylphenyl)-3-methoxy-5-aminopyrazole
1-(2'-chlorophenyl)-3-methoxy-5-aminopyrazole
1-(4'-methylphenyl)-3-methoxy-5-aminopyrazole
1-(2'-methoxybenzyl)-5-aminopyrazole
1-(2',3'-dimethoxybenzyl)-5-aminopyrazole
1-(2'-chlorobenzyl)-5-aminopyrazole
1-(2',4'-dichlorobenzyl)-5-aminopyrazole
1-(2',6'-dichlorobenzyl)-5-aminopyrazole
1-(4'-methylbenzyl)-5-aminopyrazole
1-(4'-cyanobenzyl)-5-aminopyrazole
1-(4'-ethylsulfonylbenzyl)-5-aminopyrazole
1-phenyl-3-methyl-5-aminopyrazole-3'-sulfonic acid, phenyl ester
1-phenyl-3-methyl-5aminopyrazole-4'-sulfonic acid, phenyl ester
1-phenyl-3-methyl-5-aminopyrazole-3'-sulfonic acid-(4''-methylphenyl)ester
1-phenyl-3-methyl-5-aminopyrazole-4'-sulfonic acid-(4''chlorophenyl)ester
1-(2'-chlorophenyl)-3-methyl-5-aminopyrazole-5'-sulfonic acid(3''-methoxyphenyl)ester
1-(2'-chlorophenyl)-3-methyl-5-aminopyrazole-5'-sulfonic acid(2''-methylphenyl)ester
1-(2'-chlorophenyl)-3-methyl-5-aminopyrazole-5'-sulfonic acid(4''-chlorophenyl)ester
1-phenyl-3-methyl-5-pyrazolone
1-(β-cyanoethyl)-3-methyl-5-pyrazolone
1-(3'-nitrophenyl)-3-methyl-5-pyrazolone
1-(β-hydroxypropyl)-3-methyl-5-pyrazolone
1-(2'- or 4'-chlorophenyl)-3-methyl-5-pyrazolone
1-(2'-,3'- or 4'-methoxyphenyl)-3-methyl-5-pyrazolone
1-(β-hydroxyphenylethyl)-3-methyl-5-pyrazolone
1-(2'-,3'- or 4'-methylphenyl)-3-methyl-5-pyrazolone
1-(3'- or 4'-acetylaminophenyl)-3-methyl-5-pyrazolone
1-(4'-ethylcarbonylaminophenyl)-3-methyl-5-pyrazolone
1-(4'-t-butylcarbonylaminophenyl)-3-methyl-5-pyrazolone
1-(2'-ethylsulfonylamino-4'-chlorophenyl)-3-methyl-5-pyrazolone
1-(4'-methylsulfonylaminophenyl)-3-methyl-5pyrazolone
1-(3'- or 4'-methylsulfonamidophenyl)-3-methyl-5-pyrazolone
1,3-dimethyl barbituric acid
1,3-dicyclohexyl barbituric acid
1,3-diphenyl barbituric acid
1-phenyl barbituric acid
1-phenyl-3-methyl barbituric acid
1-n-butyl barbituric acid
1,3-di-n-butyl barbituric acid
1-phenyl-3-γ-methoxypropyl barbituric acid
1-phenyl-3-benzyl barbituric acid
1-phenyl-3-β-chloroethyl barbituric acid
1-phenyl-3-β-cyanoethyl barbituric acid
1-phenyl-3-β-hydroxyethyl barbituric acid
1-(3'-chlorophenyl)-3-ethyl barbituric acid
1-(2'-methylphenyl)-3-ethyl barbituric acid
1-(4'-chlorophenyl)-3-methyl barbituric acid
1-(2'-methoxyphenyl)-3-ethyl barbituric acid
1-phenyl-3-cyclohexyl barbituric acid
1-phenyl-3-β-phenylethyl barbituric acid
1-(3',4'-dichlorophenyl)-3-methyl barbituric acid
1-(4'-bromophenyl)-3-γ-methoxypropyl barbituric acid
1-(3'-nitrophenyl)-3-methyl barbituric acid 1-(2'-methyl-5'-chlorophenyl)-3-methyl barbituric acid
1-(4'-methylphenyl)-3-isopropyl barbituric acid
1-(2'-ethoxyphenyl)-3-propyl barbituric acid
1-phenyl-3-n-butyl barbituric acid
1-phenyl-3-isopropyl barbituric acid
1-phenyl-3-β-acetoxyethyl barbituric acid
1-(2'-trifluoromethylphenyl)-3-ethyl barbituric acid
1-(3'-cyanophenyl)-3-ethyl barbituric acid
1-(4'-ethylcarbonylphenyl)-3-isopropyl barbituric acid
1-(4-ethylsulfonylphenyl)-3-ethyl barbituric acid
1-(4'-phenylsulfonylphenyl)-3-methyl barbituric acid
1-(4'-ethylcarbonyloxyphenyl)-3-n-propyl barbituric acid
1-(3'-methylsulfonamidophenyl)-3-ethyl barbituric acid
1-(4'-acetylaminophenyl)-3-n-butyl barbituric acid
1-benzyl-3-cyano-4-methyl-6-hydroxypyrid-2-one
1-(2'-tolyl)-3-cyano-4-methyl-6-hydroxypyrid-2-one
1-(2'-methoxyphenyl)-3-cyano-3-cyano-4-methyl-6-hydroxypyrid-2-one
1-(2',4'-dimethylphenyl)-3-cyano-4-methyl-6-hydroxypyrid-2-one
1-(4'-chlorophenyl)-3-cyano-4-methyl-6-hydroxypyrid-2-one
1-phenyl-3-cyano-4-methyl-6-hydroxypyrid-2-one
1-ethyl-3-cyano-4-methyl-6-hydroxypyrid-2-one
1-(γ-methoxypropyl)-3-cyano-4-methyl-6-hydroxypyrid-2-one
1-(β-hydroxyethyl)-3-cyano-4-methyl-6-hydroxypyrid-2-one
1-n-butyl-3-cyano-4-methyl-6-hydroxypyrid-2-one
1-(β-acetoxyethyl)-3-cyano-4-methyl-6-hydroxypyrid-2-one
1-(β-phenylethyl)-3-cyano-4-methyl-6-hydroxypyrid-2-one
1-(γ-ethoxypropyl)-3-cyano-4-methyl-6-hydroxypyrid-2-one
4-hydroxy coumarin
4-hydroxy-6-methyl coumarin
4-hydroxy-6,7-dimethyl coumarin
4-hydroxy-5,6-dimethyl coumarin
4-hydroxy-6-methoxy coumarin
4-hydroxy-6-bromo coumarin
4-hydroxy-5,6-diethyl coumarin
2-methylindole
1,2-dimethylindole Suitable aklylating agents are the esters of strong mineral acids and organic sulfonic acids of, preferably, lower alcohols containing from 1 to 4 carbons. These are chiefly alkyl chlorides, alkyl bromides, aralkyl halides and dialkyl sulfates. The intermediate azo compounds can also be conveniently alkylated by treatment with alkylene oxides, e.g., ethylene oxide, 1,2-propylene oxide or 1,2-butylene oxide, to yield the corresponding β-hydroxyalkyl derivatives which can, if desired, be further acylated. A cyanoethyl substituent can also be advantageously introduced by treatment of the intermediate azo compounds with acylonitrile.

The alkylation can be carried out in either an inert organic or aqueous-organic system in the presence of a suitable acid-binding agent. Suitable organic reaction media include acetone, methyl ethyl ketone, dimethylformamide, dimethylacetamide, tetrahydrofuran, ethylene glycol dimethyl ether, dioxane, acetic acid and the like. Acid-binding agents, such as magnesium oxide, sodium carbonate, potassium carbonate, dibasic sodium phosphate and sodium bicarbonate are operative in the alkylation with potassium carbonate being the preferred agent. Aqueous organic solvent mixtures such as acetone-water in conjunction with potassium carbonate are especially useful in the process as they provide a medium for both solution of the water-soluble acid-being agent and for removal of any residual unalkylated dye which is soluble in aqueous potassium carbonate. Solvent mixtures of equal weights of both organic solvent (e.g., acetone) and water are especially preferred. The molecular proportions of intermediate azo compound and alkylating agent employed may be varied within wide limits, e.g., from 1:2 to 1:5, depending on the reactivity of the alkylating agent used and the temperature. A molar ratio of 1:2 is normally satisfactory, however.

Time for the alkylation may vary from 2 hours up to 5 days again depending on the reactivity of the alkylating agent employed and the temperature. The alkylation can be carried out from 25° to 80° C., but preferably at 25°–30° C. Under more energetic conditions, e.g., 6α–80° C., the second imidazole nitrogen, in some cases, is partially alkylated and a quaternized cationic dye is also formed. The alkylated disperse dyestuff usually precipitates as it is formed and is collected by filtration and washed with water to remove inorganic salts. In cases where the alkylated dye is soluble in the reaction solvent, e.g. dimethylformamide, the reaction mixture may alternatively be drowned in water and the precipitated dyestuff subsequently isolated by filtration.

The crude dyestuffs are conveniently converted into a commercially useable form by mixing the crude dye (e.g. ten parts on a 100% basis) with about 2.5 parts of a lignin sulfonate dispersant and water in a colloid or sand mill. Milling is continued until a fine, stable, aqueous dispersion or paste is obtained with dye particle size reduced to approximately one micron.

The invention dyestuffs have excellent affinity and buildup properties on synthetic textile materials such as nylon and, in particular, on polyester textile materials, or blends thereof, thus enabling heavy depths of shade of be obtained. The resulting colorations, which range in shade from yellow to blue, have good fastness to light, to wet treatments and in particular to dry heat treatments such as those carried out at high temperature during pleating operations.

The novel invention dyes can be applied to polyester fibers by an aqueous procedure, preferably under pressure, or by padding polyester fibers, either singly or in cellulosic blends, with an aqueous dispersion of said dyes followed by dry heat (e.g. Thermosol) fixation. Both dyeing procedures are widely used in the trade. This invention is also directed to the process of dyeing and printing polyester fibers and their cellulosic blends, with the invention dyes, preferably on a fabric which is subsequently to receive a durable press treatment. The present invention also encompasses polyester fibers and blends of polyester fibers dyed or printed with an invention dye.

The following examples are given to illustrate the invention. All parts are given by weight.

EXAMPLE 1

2-Amino-4,5-dicyanoimidazole (6.65 parts, 0.050 mole) was suspended in 165 parts of water and 15.9 parts of concentrated hydrochloric acid (0.135 mole) at 0°–5° C. 5N Sodium nitrite solution (10.66 parts, 0.052 mole) was added dropwise at 0°–5° C., and a positive nitrite test was maintained for 30 minutes. Excess nitrite was destroyed with sulfamic acid. This suspension of diazonium zwitterion was used directly in the coupling step.

A solution of 14.8 parts (0.055 mole) of 3-(N-benzyl-N-ethylamino)acetanilide in 40 parts of methanol and 40 parts of acetic acid was added dropwise over 15 minutes at 0°–5° C. to the diazonium zwitterion suspension. The reaction was allowed to warm to room temperature over 4 hours, the solids collected by filtration, washed acidfree with water and dried to give 20.5 parts (99% yield) of product.

The above dry product (8.24 parts, 0.02 mole) was suspended in 125 parts of acetone. A solution of 7.52 parts (0.055 mole) of potassium carbonate in 125 parts of water was added and the reaction stirred for 5 minutes until solution was complete. Diethyl sulfate (15.4 parts, 0.10 mole) was added and the reaction mixture stirred at 25°–30° C. for 6 hours. The solids were isolated by filtration, washed with water and dried to give 7.9 parts (90.0% yield) of red product. Recrystallization from isopropanol provided an analytically pure sample, $a_{max}$. 141 liters g.$^{-1}$cm.$^{-1}$ at $\lambda_{max}$. 527 m$\mu$.

The structure of the dye is

[Structure: NC and NC groups on pyrazine ring with N-C$_2$H$_5$, connected via N=N to phenyl with NHCOCH$_3$ and N(C$_2$H$_5$)(CH$_2$C$_6$H$_5$)]

EXAMPLE 2

To a stirred suspension of 6.65 parts (0.050 mole) of 2-amino-4,5-dicyanoimidazole in 160 parts of water and 7.91 parts (0.081 mole) of concentrated hydrochloric acid at 20°–25° C. was added 10.66 parts (0.052 mole) of 5N sodium nitrite solution. The color of the suspension changed from white to very pale cream, and the temperature rose 3-4' C. A positive nitrite test was maintained for 30 minutes and the excess nitrite was then destroyed by the addition of sulfamic acid.

A solution of 12.92 parts (0.055 mole) of N-ethyl-N'-(3-diethylamino)phenyl urea in 100 parts of acetic acid was added dropwise over 30 minutes to the suspension of the diazonium compound at 20°–25° C. The slurry turned red and the intermediate monoazo dye precipitated out as the diazonium slurry disappeared. The pH was raised to 3.5–4.0 by the addition of solid sodium acetate and the mixture stirred at room temperature for 16 hours. The solids were isolated by filtration and washed with water.

The above wet product was suspended in a mixture of 100 parts of acetone and 100 parts of water. Potassium carbonate (13.8 parts, 0.10 mole) and diethyl sulfate (15.4 parts, 0.10 mole) were added and the mixture stirred at 25°–30° C. for 16 hours. The alkylated dye precipitated and was collected by filtration, washed with water and dried to yield 18.71 parts (92.0% yield) of red product. Recrystallization from isopropanol provided an analytically pure sample, $a_{max}$. 117.3 liters g.$^{-1}_{cm.}$$^{-1}$ at $\lambda_{max}$. 528 m$\mu$.

The structure of the dye is

[Structure: dicyanopyrazine-N(C$_2$H$_5$)-N=N-phenyl(NHCONHC$_2$H$_5$)-N(C$_2$H$_5$)$_2$]

EXAMPLE 3

The diazotization of 2-amino-4,5-dicyanoimidazole (0.05 mole) was carried out essentially as described in Example 2 above.

A solution of 11.33 parts (0.055 mole) of 3-(N,N-diethylamino)acetanilide in 50 parts of acetic acid and 50 parts of methanol was added dropwise over 15 minutes at 20°–25° C. to the diazo suspension. The mixture was stirred at 25°–30° C. for 4 hours, filtered and the collected solids washed with water and dried to give 15.58 parts (89% yield) of red product.

The above product (3.50 parts, 0.01 mole) was dissolved in 70 parts of dimethylformamide. Dibasic sodium phosphate (1.42 parts, 0.01 mole) and dimethyl sulfate (4.0 parts, 0.032 mole) were added and the reaction mixture heated at 80° C. for 2 hours. A small amount of cationic dye, as evidenced by the presence of a red baseline spot in the thin-layer chromatogram of the reaction mass, was also formed in addition to the desired alkylated disperse dye. The reaction mass way cooled to 25°–30° C., filtered to remove the acid-binding agent, and the filtrate drowned in 300 parts of water. The solids were isolated by filtration, washed with water and dried to give 2.73 parts (75% yield) of red product. Thin layer chromatography on silica gel coated glass plates using benzene-acetonitrile (4:1) as eluent showed only one red spot and none of the cationic dye originally detected was present in the isolated product. Recrystallization from isopropanol provided an analytically pure sample, $a_{max}$. 132 liters g.$^{-1}$cm.$^{-1}$ at $\lambda_{max}$. 523 m$\mu$.

The structure of the dye is

[Structure: dicyanopyrazine-N(CH$_3$)-N=N-phenyl(NHCOCH$_3$)-N(C$_2$H$_5$)$_2$]

EXAMPLE 4

The intermediate azo compound of Example 3 (7.0 parts, 0.02 mole)

[Structure: dicyanoimidazole-NH-N=N-phenyl(NHCOCH$_3$)-N(C$_2$H$_5$)$_2$]

was dissolved in 120 parts of dimethylformamide. Dibasic sodium phosphate (2.84 parts, 0.02 mole) and allyl chloride (7.6 parts, 0.10 mole) were added and the mixture heated at 80° C. for 18 hours. The reaction mass was cooled to 25°–30° C., filtered, and the filtrate drowned in 300 parts of water. The solids were isolated by filtration, washed with water and dried to give 5.46 parts (70% yield) of red product. Column chromatography on silica gel using chloroform as eluent provided an analytical pure sample, $a_{max.}$ 124 liters g.$^{-1}$cm.$^{-1}$ at $\lambda_{max.}$ 540 m$\mu$.

The structure of the dye is

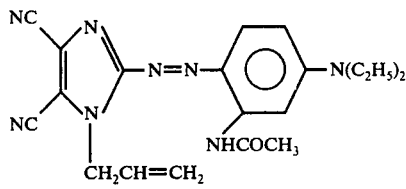

EXAMPLE 5

The intermediate azo compound of Example 3 (3.50 parts, 0.01 mole) was suspended in 50 parts of acetone and 50 parts of water containing 1.52 parts (0.011 mole) of potassium carbonate. Benzyl chloride (6.35 parts, 0.050 mole) was added and the reaction stirred at 25°-30° C. for 72 hours. Thin layer chromatography showed that considerable unalkylated starting material remained. The solids were collected by filtration, washed with water and dried and give 2.3 parts (52% yield) of red product. Thin layer chromatography showed only one red spot, and unalkylated dye was retained in the filtrate. The product had an $a_{max.}$ of 112 liters g. $^{-1}$cm.$^{-1}$ at $\lambda_{max.}$ 542 m$\mu$.

The structure of the dye is

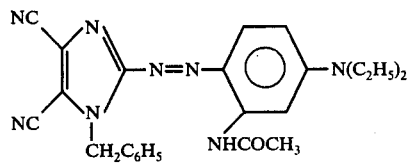

EXAMPLE 6

The intermediate azo compound of Example 3 (3.50 parts, 0.01 mole) was dissolved in 70 parts of dimethylformamide. Dibasic sodium phosphate (1.42 parts, 0.01 mole) and 1,2-butylene oxide (2.16 parts, 0.03 mole) were added and the mixture heated at 60° C. for 48 hours. The reaction mixture was cooled to 25°-30° C. and the solids were collected by filtration, washed with water and dried. Thin layer chromatographic analysis of the product revealed only one red spot.

The above alkylated product (0.90 part) was dissolved in 20 parts of pyridine and 2.2 parts of acetic anhydride were added. The mixture was heated at 80° C. for 4 hours, cooled to 25°-30° C. and the final dyestuff precipitated by the dropwise addition of 50 parts of water. The solids were filtered, washed with water and dried to give 0.80 part of red product, $a_{max.}$ 103 liters g. $^{-1}$cm.$^{-1}$ at $\lambda_{max.}$ 540 m$\mu$.

The structure of the dye is

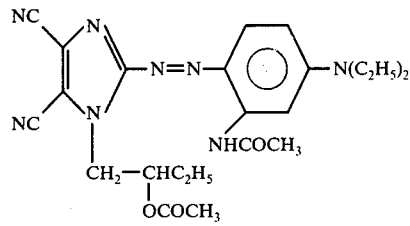

EXAMPLE 7

To 160 parts of water and 7.91 parts (0.081 mole) of concentrated hydrochloric acid were added 6.65 parts (0.050 mole) of 2-amino-4,5-dicyanoimidazole. 10.66 Parts (0.052 mole) of 5N sodium nitrite solution were added rapidly at 20°-25° C. A positive nitrite test was maintained for 30 minutes and the excess nitrite was then destroyed by the addition of sulfamic acid.

A solution of 7.15 parts (0.05 mole) of $\alpha$-naphthylamine in 50 parts of acetic acid was then added over a period of 30 minutes to the diazo suspension at 20°-25° C. The reaction mass became thick as coupling proceeded; it was diluted with 200 parts of water.

The pH was adjusted to 6.5 with 30% aqueous caustic soda, during which procedure the temperature rose to 40°-50° C. The intermediate monoazo amine was isolated by filtration, washed thoroughly with water, and dried to yield 12.2 parts (85% yield) of product.

14.35 Parts (0.050 mole) of the above monoazo amine were slurried to a smooth paste in a mixture of 100 parts of acetic acid, 80 parts of water and 7.91 parts (0.081 mole) of concentrated hydrochloric acid. 10.66 Parts (0.052 mole) of 5N sodium nitrite solution were added over a 5-minute period at 25°-30° C. After maintaining an excess of nitrite for 30 minutes, the excess was destroyed with sulfamic acid.

A solution of 11.33 parts (0.055 mole) of 3-(N,N-diethylamino)acetanilide in 100 parts of acetic acid was then added to the diazo solution over a period of 30 minutes at 20°-25° C.; the reaction was allowed to proceed until there was no longer any discernible diazonium salt in the reaction mixture. The pH was raised to 3.5-4.0 by the addition of solid sodium acetate and the slurry stirred for 2 hours. The solids were isolated by filtration, washed thoroughly with water and dried to yield 18.4 parts (73% yield) of blue product, $a_{max.}$ 69 liters g.$^{-1}$cm.$^{-1}$ at $\lambda_{max.}$ 555 m$\mu$.

24.5 Parts (0.050 mole) of the above bisazo intermediate were suspended in a mixture of 100 parts of acetone and 100 parts of water. 13.8 Parts (0.10 mole) of potassium carbonate and 15.4 parts (0.10 mole) diethyl sulfate were added and the mixture stirred at 25°-30° C. for 16 hours. The solids were isolated by filtration, washed with water and dried to yield 21.3 parts (80% yield) of blue product, $a_{max.}$ 98 liters g. $^{-1}$cm.$^{-1}$ at $\lambda_{max.}$ 638 m$\mu$.

The structure of the dye is

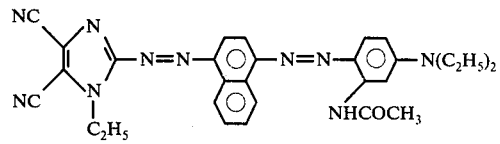

EXAMPLES 8-133

Examples 8-133 were prepared by procedures similar to those described in Examples 1-7.

Structure:

$$NC-\underset{\underset{R_1}{|}}{\underset{|}{C}}=\underset{\underset{}{|}}{C}-C(CN)=N-N=N-(W-N=N)_m-\text{phenyl}(R_2, R_3, R_4\text{N}R_5, R_6)$$

(Pyrazole with NC substituents, N-R1, coupled via azo to a benzene ring bearing R2, R3, NR4R5 (as NR3R4 on one side), R6, with optional (W-N=N)_m bridge.)

| Example No. | R1 | R2 | R3 | R4 | R5 | R6 | W | m | λmax (mμ) | a max (l.g⁻¹cm⁻¹) | Shade on Polyester |
|---|---|---|---|---|---|---|---|---|---|---|---|
| 8 | CH3 | H | C2H4OCOCH3 | C2H4OCOCH3 | H | NHCOCH3 | — | 0 | 518 | 100 | Scarlet |
| 9 | CH3 | H | CH3 | CH3 | H | CH3 | — | 0 | 516 | 106 | Scarlet |
| 10 | CH3 | H | CH3 | CH3 | H | NHCOC6H5 | — | 0 | 522 | 123 | Red |
| 11 | CH3 | H | C2H4CO2CH3 | C2H4CO2CH3 | H | NHCOCH3 | — | 0 | 518 | 106 | Scarlet |
| 12 | CH3 | H | C2H5 | C2H4CO2CH3 | H | NHCOCH3 | — | 0 | 521 | 127 | Red |
| 13 | CH2CH(OH)C2H5 | H | CH3 | C2H5 | H | NHCOCH3 | — | 0 | 530 | 125 | Red |
| 14 | CH3 | H | CH2C6H5 | CH3C6H5 | H | NHCOCH3 | — | 0 | 520 | 126 | Red |
| 15 | C2H5 | H | C2H5 | C2H5 | H | NHCOCH3 | — | 0 | 528 | 124 | Red |
| 16 | (CH2)3CH3 | H | (CH2)3CH3 | (CH2)3CH3 | H | NHCOCH3 | — | 0 | 535 | 139 | Red |
| 17 | C2H5 | H | CH3 | CH3C6H5 | H | NHCOCH3 | — | 0 | 533 | 142 | Red |
| 18 | C2H5 | H | CH3 | CH2CH(OH)C2H5 | H | NHCOCH3 | — | 0 | 527 | 141 | Red |
| 19 | CH3 | H | C2H5 | C2H5 | H | NHCOCH3 | — | 0 | 530 | 120 | Red |
| 20 | CH3 | H | C2H4OH | C2H4OH | H | CH3 | — | 0 | 515 | 147 | Scarlet |
| 21 | CH3 | H | C2H4CN | C2H4CN | H | NHCOCH3 | — | 0 | 518 | 128 | Scarlet |
| 22 | CH3 | OCH3 | CH3 | H | H | NHCOCH3 | — | 0 | 519 | 123 | Scarlet |
| 23 | CH2CH2CH3 | OCH3 | CH3 | C2H5 | H | NHCOCH3 | — | 0 | 545 | 107 | Red |
| 24 | CH2CH2CH3 | OCH3 | CH3 | C2H5 | H | NHCOCH3 | — | 0 | 567 | 118 | Bordeaux |
| 25 | CH2CH2CH3 | H | C2H5 | C2H4OCOCH3 | H | NHCOCH3 | — | 0 | 533 | 82 | Red |
| 26 | CH2CH2CH3 | H | C2H5 | C2H4CN | H | CH3 | — | 0 | 502 | 104 | Orange |
| 27 | C2H5 | —CH2CH(OC2H4CN)CH2— | C2H5 | H | CH3 | — | 0 | 520 | 117 | Scarlet |
| 28 | CH2CH2CH3 | H | C2H4CN | C2H4OH | H | CH3 | — | 0 | 515 | 106 | Orange |
| 29 | CH2CH2CH3 | H | C2H4CN | C2H4COCH3 | H | CH3 | — | 0 | 492 | 83 | Orange |
| 30 | CH2CH2CH3 | H | C2H4CN | H | H | NHCOCH3 | — | 0 | 508 | 106 | Scarlet |
| 31 | CH2CH2CH3 | H | C2H4CN | CH2CH(OCOCH3)C2H5 | H | NHCOCH3 | — | 0 | 528 | 101 | Scarlet |
| 32 | CH2CH2CH3 | H | C2H4CN | CH2CH(OCOCH3)C2H5 | H | NHCOCH3 | — | 0 | 512 | 62 | Red |
| 33 | CH2CH2CH3 | H | C2H4CN | C2H4OH | H | NHCOCH3 | — | 0 | 518 | 113 | Red |
| 34 | CH2CH2CH3 | H | C2H4CN | C2H4CH(OH)C2H5 | H | NHCOCH3 | — | 0 | 517 | 112 | Scarlet |
| 35 | CH3 | H | CH3 | CH3 | H | NHCOC(CH3)3 | — | 0 | 515 | 123 | Red |
| 36 | C2H5 | H | C2H4OCOCH3 | C2H5 | H | NHSO2CH3 | — | 0 | 535 | 80 | Red |
| 37 | C2H5 | H | CH3 | C2H5 | H | NHCO2CH3 | — | 0 | 517 | 142 | Red |
| 38 | C2H5 | H | CH3 | C2H5 | H | NHCOC6H13 | — | 0 | 522 | 138 | Red |
| 39 | C2H5 | H | CH3 | C2H5 | H | NHCOC6H5 | — | 0 | 520 | 113 | Cerise |
| 40 | C2H5 | H | CH3 | C2H5 | H | NHCONHC6H9 | — | 0 | 525 | 119 | Scarlet |
| 41 | C2H5 | H | C2H5 | C2H5 | H | NHCOC6H4OC2H5 | — | 0 | 518 | 116 | Scarlet |
| 42 | C2H5 | H | C2H5 | C2H5 | H | NHCO2C2H4OC2H5 | — | 0 | 519 | 132 | Scarlet |
| 43 | C2H5 | H | C2H5 | C2H5 | H | NHCOCH2OC2H5 | — | 0 | 518 | 131 | Scarlet |
| 44 | C2H5 | H | C2H5 | C2H5 | H | NHCOCH2Cl | — | 0 | 520 | 106 | Red |
| 45 | C2H5 | H | C2H5 | C2H5 | H | NHCOCH3 | — | 0 | 522 | 126 | Red |
| 46 | C2H5 | H | C2H5 | C2H5 | H | NHSO2CH3 | — | 0 | 535 | 115 | Scarlet |
| 47 | C2H5 | H | C2H4OCOC2H5 | C2H4OCOC2H5 | H | NHCOC3H7 | — | 0 | 517 | 87 | Scarlet |
| 48 | C2H5 | H | C2H4OCOC3H7 | C2H4OCOC3H7 | H | CH3 | — | 0 | 514 | 74 | Red |
| 49 | CH2C6H5 | H | C2H5 | C3H7 | H | CH3 | — | 0 | 509 | 113 | Red |
| 50 | C2H5 | H | C2H5 | CH2C6H5 | H | CH3 | — | 0 | 526 | 119 | Scarlet |
| 51 | C2H5 | H | C2H5 | CH2CH(OH)C2H5 | H | CH(OH)CH3 | — | 0 | 518 | 116 | Scarlet |
| 52 | C2H5 | H | C2H4CO2CH3 | C2H4CO2CH3 | H | CH3 | — | 0 | 519 | 134 | Scarlet |
| 53 | C2H5 | H | C2H5 | C2H5 | H | OH | — | 0 | 520 | 117 | Red |
| 54 | CH3 | H | C2H5 | H | H | NHCOCH3 | — | 0 | 514 | 137 | Orange |
| 55 | CH3 | H | H | H | H | NHCOCH3 | — | 0 | 502 | 93 | Orange |
| 56 | CH3 | —CH2CH(OH)CH2— | — | — | — | —CH=CH—CH=CH— | — | 0 | 571 | 143 | Red-Violet |

-continued

Structure:

$$\underset{NC}{\overset{NC}{\underset{\|}{\bigvee}}}\underset{N}{\overset{N}{\bigvee}}_{R_1}-N=N-(W-N=N)_m-\underset{R_6}{\overset{R_2}{\bigvee}}\underset{R_5}{\overset{R_3}{\underset{N}{\bigvee}}}_{R_4}$$

| Example No. | $R_1$ | $R_2$ | $R_3$ | $R_4$ | W | $R_5$ | $R_6$ | m | $\lambda_{max}$ (mµ) | $a_{max}$ (l. g.$^{-1}$ cm.$^{-1}$) | Shade on Polyester |
|---|---|---|---|---|---|---|---|---|---|---|---|
| 57 | $C_2H_5$ | $-CH_2CH(OH)CH_2-$ | | H | — | $-CH=CH-CH=CH-$ | | 0 | 572 | 140 | Red-Violet |
| 58 | $CH_2CH_2CH_3$ | H | ![tetrahydropyran-CH2] | H | — | $-CH=CH-CH=CH-$ | | 0 | 547 | 84 | Bordeaux |
| 59 | $CH_3$ | H | $C_2H_4CONH_2$ | H | — | $-CH=CH-CH=CH-$ | | 0 | 542 | 97 | Bordeaux |
| 60 | $CH_3$ | H | $C_2H_4CONHCH_3$ | H | — | $-CH=CH-CH=CH-$ | | 0 | 541 | 89 | Bordeaux |
| 61 | $C_2H_5$ | H | $C_2H_5$ | $C_2H_5$ | — | $-CH=CH-CH=CH-$ | | 0 | 550 | 129 | Bordeaux |
| 62 | $C_2H_5$ | H | $C_2H_4CH$ | H | — | $-CH=CH-CH=CH-$ | | 0 | 542 | 117 | Bordeaux |
| 63 | $CH_2CH_2CH_3$ | $-CH_2CH(OCOC_5H_{11})CH_2-$ | | H | — | $-CH=CH-CH=CH-$ | | 0 | 540 | 91 | Bordeaux |
| 64 | $C_2H_5$ | H | $C_2H_5$ | H | — | $-CH=CH-CH=CH-$ | | 0 | 558 | 101 | Reddish Blue |
| 65 | $C_2H_5$ | $C_2H_5$ | | $C_2H_5$ | — | H | $NHCOCH_3$ | 1 | 610 | 107 | |
| 66 | $C_2H_5$ | H | $C_2H_5$ | $C_2H_5$ | 2-methoxy-5-methylphenyl | H | $CH_3$ | 1 | 630 | 93 | Blue |
| 67 | $C_2H_5$ | H | $C_2H_5$ | $C_2H_5$ | naphthalene | H | $CH_3$ | 1 | 627 | 106 | Blue |
| 68 | $C_2H_5$ | H | $C_2H_5$ | $C_2H_5$ | 2,5-dimethoxyphenyl / 3-methoxy-5-methylphenyl | $-CH=CH-CH=CH-$ | | 1 | 520 | 53 | Red-Violet |

-continued

Structure:

$$\text{NC}-\underset{\underset{R_1}{|}}{\underset{N}{\overset{N}{\diagdown}}}=N-(W-N=N)_m-\underset{\underset{R_6}{}}{\overset{R_2}{\underset{R_5}{\overset{R_3}{\diagdown N{\diagup}R_4}}}}$$
(with CN group on pyrazole)

| Example No. | $R_1$ | $R_2$ | $R_3$ | $R_4$ | $R_5$ | $R_6$ | W | m | $\lambda_{max}$ (mμ) | $a_{max}$ (l.g$^{-1}$cm$^{-1}$) | Shade on Polyester |
|---|---|---|---|---|---|---|---|---|---|---|---|
| 69 | CH$_3$ | H | C$_2$H$_5$ | CH$_2$CH(OH)CH$_2$OC$_6$H$_5$ | H | CH$_3$ | — | 0 | 515 | 100 | Scarlet |
| 70 | CH$_3$ | H | C$_2$H$_5$ | CH$_2$CH(OH)C$_6$H$_5$ | H | H | — | 0 | 512 | 87 | Scarlet |
| 71 | CH$_3$ | H | C$_2$H$_5$ | CH$_2$CH(OH)CH$_2$Cl | H | CH$_3$ | — | 0 | 509 | 106 | Scarlet |
| 72 | CH$_3$ | H | C$_2$H$_5$ | C$_2$H$_5$ | H | Cl | — | 0 | 511 | 129 | Scarlet |
| 73 | CH$_3$ | H | C$_2$H$_5$ | C$_2$H$_5$ | H | NHCOC$_2$H$_5$ | — | 0 | 525 | 133 | Red |
| 74 | CH$_3$ | H | C$_2$H$_5$ | C$_2$H$_5$ | H | NHCOCH$_3$ | — | 0 | 528 | 123 | Red |
| 75 | CH$_3$ | H | C$_2$H$_5$ | C$_2$H$_5$ | H | NHCOCH$_3$ | — | 0 | 525 | 132 | Red |
| 76 | CH$_3$ | H | CH$_3$ | CH$_3$ | H | NHCOCH$_3$ | — | 0 | 520 | 135 | Red |
| 77 | CH$_3$ | H | C$_2$H$_5$ | C$_2$H$_5$ | H | NHCOC(CH$_3$)$_3$ | — | 0 | 519 | 135 | Red |
| 78 | CH$_3$ | H | C$_2$H$_5$ | C$_2$H$_5$ | H | NHCOCO$_2$CH$_3$ | — | 0 | 500 | 127 | Red |
| 79 | CH$_2$C$_6$H$_5$ | H | C$_2$H$_5$ | C$_2$H$_5$ | H | NHCOC$_2$H$_5$ | — | 0 | 528 | 136 | Red |
| 80 | CH$_2$CH=CH$_2$ | H | C$_2$H$_5$ | C$_2$H$_5$ | H | NHCO$_2$CH$_3$ | — | 0 | 515 | 122 | Red |
| 81 | CH$_2$CH=CH$_2$ | H | C$_2$H$_5$ | C$_2$H$_5$ | H | CH$_3$ | — | 0 | 528 | 122 | Scarlet |
| 82 | CH$_2$CH=CH$_2$ | H | C$_2$H$_5$ | CH$_2$C$_6$H$_5$ | H | CH$_3$ | — | 0 | 510 | 104 | Red |
| 83 | CH$_2$CH$_2$C$_6$H$_5$ | H | C$_2$H$_5$ | CH$_2$CH(OH)CH$_2$CN | H | CH$_3$ | — | 0 | 510 | 107 | Scarlet |
| 84 | CH$_2$CH$_2$C$_6$H$_5$ | H | C$_2$H$_5$ | CH$_2$C$_6$H$_4$—(3')NO$_2$ | H | CH$_3$ | — | 0 | 503 | 107 | Red |
| 85 | CH$_2$CH=CH—C$_6$H$_5$ | H | C$_2$H$_5$ | CH$_2$C$_6$H$_5$ | H | CH$_3$ | — | 0 | 515 | 111 | Red |
| 86 | CH$_2$CH=CH—(3)NO$_2$ | H | C$_2$H$_5$ | C$_2$H$_5$ | H | CH$_3$ | — | 0 | 515 | 118 | Red |
| 87 | CH$_2$CH=CH—(4')Cl | H | C$_2$H$_5$ | C$_2$H$_5$ | H | CH$_3$ | — | 0 | 508 | 105 | Red |
| 88 | C$_6$H$_5$ | H | C$_2$H$_5$ | C$_2$H$_5$ | H | CH$_3$ | — | 0 | 525 | 98 | Red |
| 89 | C$_6$H$_5$ | H | CH$_2$CH$_2$CH$_2$CH$_2$CH$_2$ (ring) | CH$_3$ | H | CH$_3$ | — | 0 | 520 | 119 | Red |
| 90 | C$_2$H$_5$ | OCH$_3$ | C$_2$H$_4$CN | H | CH$_3$ | — | — | 0 | — | Scarlet | — |
| 91 | CH$_3$ | H | C$_2$H$_5$ | CH$_2$C$_6$H$_5$—(4')Cl | H | NHCOCH$_3$ | — | 0 | — | — | Red |
| 92 | CH$_3$ | H | C$_2$H$_5$ | C$_2$H$_5$ | H | CH$_3$ | — | 0 | — | — | Red |
| 93 | CH$_3$ | H | CH$_2$CH(OH)CH$_2$OC$_6$H$_5$ | C$_2$H$_5$ | H | NHCOC$_2$H$_5$ | — | 0 | — | — | Cerise |
| 94 | CH$_2$C$_6$H$_5$ | H | CH$_2$CH(OH)CH$_2$OC$_6$H$_6$ | C$_2$H$_5$ | H | NHCOCH$_3$ | — | 0 | — | — | Red |
| 95 | CH$_2$C$_6$H$_5$ | H | C$_2$H$_4$OH | C$_2$H$_5$ | H | NHCOCH$_3$ | — | 0 | — | — | Red |
| 96 | CH$_3$ | H | CH$_2$CH$_2$CH$_2$CH$_2$CH$_2$ | H | H | NHCOCH$_2$OH | — | 0 | — | — | Scarlet |
| 97 | CH$_3$ | H | C$_2$H$_4$OC$_2$H$_4$CN | C$_2$H$_4$OC$_2$H$_4$CN | H | NHCOCH$_3$ | — | 0 | — | — | Scarlet |
| 98 | CH$_3$ | H | C$_2$H$_5$ | CH$_2$C$_6$H$_5$ | H | CH$_3$ | — | 0 | — | — | Scarlet |
| 99 | CH$_3$ | H | —CH$_2$CH$_2$—O—CH$_2$CH$_2$— | — | H | NHCOCH$_3$ | — | 0 | — | — | Red |
| 100 | C$_2$H$_5$ | H | C$_2$H$_4$OC$_2$H$_4$CN | C$_2$H$_4$OC$_2$H$_4$CN | H | CH$_3$ | — | 0 | — | — | Orange |
| 101 | CH$_3$ | H | C$_2$H$_5$ | C$_2$H$_4$CN | H | NHCOCH$_3$ | — | 0 | — | — | Orange |
| 102 | CH$_3$ | H | CH$_2$C$_6$H$_5$ | —CH$_2$CH$_2$—O—CH$_2$CH$_2$— | H | NHCOCH$_3$ | — | 0 | — | — | Red |
| 103 | CH$_3$ | H | C$_2$H$_4$OCONHC$_4$H$_9$-n | C$_2$H$_4$CN | H | NHCOCH$_3$ | — | 0 | — | — | Scarlet |
| 104 | CH$_3$ | H | C$_2$H$_4$OCONHC$_4$H$_9$-n | C$_2$H$_4$CN | H | NHCOC$_2$H$_5$ | — | 0 | — | — | Scarlet |
| 105 | C$_2$H$_5$ | H | C$_2$H$_4$OCONHC$_4$H$_9$-n | C$_2$H$_4$CN | H | NHCOCH$_3$ | — | 0 | — | — | Red |
| 106 | CH$_3$ | H | C$_2$H$_4$OCOCH$_3$ | C$_2$H$_4$CN | H | NHCOC$_2$H$_5$ | — | 0 | — | — | Red |
| 107 | CH$_3$ | H | CH$_3$ | C$_2$H$_4$CN | H | NHCOCH$_3$ | — | 0 | — | — | Scarlet |
| 108 | CH$_2$C$_6$H$_5$ | H | C$_2$H$_5$ | C$_2$H$_4$CN | H | NHCOCH$_3$ | — | 0 | — | — | Scarlet |
| 109 | CH$_2$C$_6$H$_5$ | H | C$_2$H$_5$ | C$_2$H$_4$CN | H | NHCOC$_2$H$_5$ | — | 0 | — | — | Scarlet |
| 110 | CH$_2$C$_6$H$_5$ | H | C$_2$H$_5$ | C$_2$H$_4$OCONHC$_4$H$_9$-n | H | NHCOCH$_3$ | — | 0 | — | — | Scarlet |
| 111 | CH$_2$C$_6$H$_5$ | H | C$_2$H$_5$ | C$_2$H$_4$OCONHC$_4$H$_9$-n | H | CH$_3$ | — | 0 | — | — | Cerise |
| 112 | CH$_2$C$_6$H$_5$ | H | C$_2$H$_5$ | CH$_3$ | H | NHCOCH$_3$ | — | 0 | — | — | Scarlet |
| 113 | CH$_2$C$_6$H$_5$ | H | C$_2$H$_4$CN | C$_2$H$_5$ | H | NHCOCH$_3$ | — | 0 | — | — | Scarlet |

-continued

[Structure: pyrazole ring with NC groups, N-R₁, connected via N=N-(W)ₘ-N=N to a phenyl ring with substituents R₂, R₃, R₄ (on N), R₅, R₆]

| Example No. | R₁ | R₂ | R₃ | R₄ | R₅ | R₆ | W | m | λ_max (mμ) | a_max (l.g⁻¹cm⁻¹) | Shade on Polyester |
|---|---|---|---|---|---|---|---|---|---|---|---|
| 114 | CH₂C₆H₅ | H | C₂H₄CN | C₂H₄OCOC₃H₇-n | H | NHCOCH₃ | — | 0 | | | Scarlet |
| 115 | CH₂C₆H₅ | H | C₂H₄CN | C₂H₄OCONHC₄H₉-n | H | NHCOCH₃ | — | 0 | | | Scarlet |
| 116 | CH₂C₆H₅ | H | CH₃ | C₆H₅ | H | NHCOCH₂OH | — | 0 | | | Cerise |
| 117 | CH₂C₆H₅ | H | CH₃ | CH₃ | H | NHCOC₂H₅ | — | 0 | | | Red |
| 118 | CH₂C₆H₅ | H | CH₃ | CH₃ | H | NHCOC₃H₇-n | — | 0 | | | Red |
| 119 | C₂H₅ | H | C₂H₄CN | C₂H₄CO₂C₂H₅ | H | NHCOCH₃ | — | 0 | | | Orange |
| 120 | C₂H₅ | H | C₂H₅ | C₂H₄CO₂C₄H₉-n | H | CH₃ | — | 0 | | | Orange |
| 121 | C₂H₅ | H | CH(CH₃)₂ | C₂H₄OC₂H₅ | H | NHCOCH₃ | — | 0 | | | Scarlet |
| 122 | C₂H₅ | H | C₂H₅ | C₂H₄CN | H | NHCOC₂H₅ | — | 0 | | | Scarlet |
| 123 | C₂H₅ | H | C₂H₅ | C₂H₄OH | H | NHCOC₃H₇-n | — | 0 | | | Red |
| 124 | CH₂C₆H₅ | H | C₂H₅ | C₂H₄OH | H | CH₃ | — | 0 | | | Red |
| 125 | CH₂C₆H₅ | H | C₂H₅ | C₂H₄NHCOCH₃ | H | CH₃ | — | 0 | | | Scarlet |
| 126 | CH₂C₆H₅ | H | C₂H₅ | C₂H₄NHCONHC₆H₅ | H | CH₃ | — | 0 | | | Red |
| 127 | CH₂C₆H₅ | H | C₂H₅ | [—C₂H₄—N bridging two C(=O) groups on ortho-phenylene] | H | CH₃ | — | 0 | | | Scarlet |
| 128 | CH₂C₆H₅ | H | C₂H₅ | C₂H₄NHCOCH₂OH | H | CH₃ | — | 0 | | | Red |
| 129 | CH₂C₆H₅ | H | C₂H₅ | [—C₂H₄—N bridging cyclohexane-1,3-dione with OCOC₆H₅] | H | CH₃ | — | 0 | | | Scarlet |
| 130 | CH₂C₆H₅ | H | C₂H₅ | —C₂H₄NHCOC₆H₅ | H | CH₃ | — | 0 | | | Scarlet |
| 131 | CH₂C₆H₅ | H | CHCH₂CH₂CH₂CH₂CH₂ (cyclic with C₂H₄) | C₂H₄CN | H | CH₃ | — | 0 | | | Orange |
| 132 | C₂H₅ | H | CH₂C₂H₅ | H | H | NHCOCH₃ | — | 0 | | | Scarlet |
| 133 | CH₂C₆H₅ | H | C₂H₄CN | H | H | NHCOC₂H₅ | — | 0 | | | Scarlet |

EXAMPLES 134–136

A suspension of 2-diazo-4,5-dicyanoimidazole (0.050 mole) was prepared as described in Example 2.

A solution of 7.92 parts (0.055 mole) of 2-naphthol and 2.20 parts (0.055 mole) of sodium hydroxide in 100 parts of water and 50 parts of dimethylformamide was added dropwise over 30 minutes to the suspension of the diazonium compound at 20°–25° C. The slurry turned red and the intermediate monoazo dye precipitated out as the diazonium slurry disappeared. The slurry was stirred at 20°–25° C. for 4 hours while maintaining the pH at 9–11 by the addition of 10% sodium hydroxide solution as required. After coupling was complete, the pH was adjusted to 5.0 with concentrated hydrochloric acid and stirred for 1 more hour at 25°–30° C. The solids were isolated by filtration, washed with water and dried to give 12.24 parts (85% yield) of red product.

14.40 Parts (0.05 mole) of the above product were suspended in a mixture of 100 parts of acetone and 100 parts of water. Potassium carbonate (13.8 parts, 0.10 mole) and diethyl sulfate (15.4 parts, 0.10 mole) were added and the mixture stirred at 25°–30° C. for 16 hours. The alkylated dye precipitated and was collected by filtration, washed with water and dried to give 12.56 parts (80% yield) of red product. Thin layer chromatography showed the product to consist mainly of the desired red N-alkylated dye together with a small amount of a second red component presumably being formed by the alkylation of the hydroxy substituent in the coupling component. Column chromatography on silica gel using chloroform as solvent provided the pure dye, a $_{max.}$ 87 liters g. $^{-1}$cm.$^{-1}$ at $\lambda_{max}$ 524 m$\mu$.

The structure of the dye is

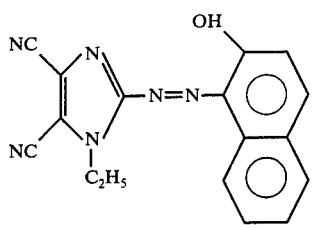

In similar fashion, coupling of 2-diazo-4,5-dicyanoimidazole to 3-methoxycarbonyl-2-naphthol and 3-t-butylcarbamoyl-2-naphthol, followed by alkylation with diethyl sulfate provided the following two dyes

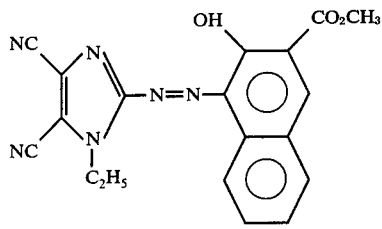

EXAMPLE 135

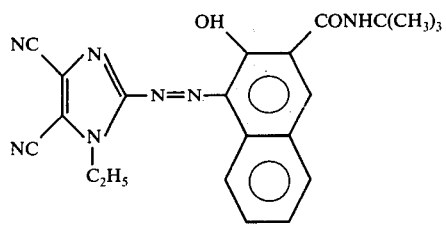

EXAMPLE 136

EXAMPLE 137

A suspension of 0.05 mole of 2-diazo-4,5-dicyanoimidazole was prepared as described in Example 2.

A solution of 9.1 parts (0.055 mole) of 1-phenyl-3-methyl-5-pyrazolone in 150 parts of dimethylacetamide was added to the diazo suspension over 15 minutes at <10° C. 6.6 Parts (0.05 mole) of sodium acetate were added and the mixture stirred for 4 hours at <10° C. The solids were isolated by filtration, washed with water and dried to give 19.1 parts (60% yield) of golden yellow needles.

A mixture of 15.9 parts (0.050 mole) of the above product, 100 parts of acetone, 100 parts of water, 13.8 parts (0.10 mole) of potassium carbonate and 12.6 parts (0.10) mole of dimethyl sulfate was stirred at 25°–30° C. for 16 hours. The yellow solids were isolated by filtration, washed with water and dried to give a quantitative yield (16.5 parts) of yellow crystalline product, $a_{max.}$ 67 liters g.$^{-1}$cm$^{-1}$ at $\lambda_{max.}$ 450 m$\mu$. Thin layer chromatography revealed the presence of a single yellow component.

The structure of the dye is

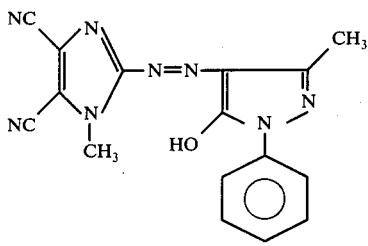

EXAMPLE 138

A suspension of (0.05 mole) 2-diazo-4,5-dicyanoimidazole was prepared as described in Example 2.

The above diazo suspension was added dropwise over 15 minutes to a solution of 12.0 parts (0.050 mole) of 1,3-di-n-butyl barbituric acid, 2.0 parts (0.050 mole) of sodium hydroxide and 7.48 parts of sodium carbonate in 300 parts of water at 0–5° C. The mixture was allowed to warm to 25°–30° C. and stirred for 4 hours. The solids were filtered, washed with water and dried to yield 18.58 parts of yellow product.

3.83 Parts (0.01 mole) of the above product were suspended in 100 parts of acetone. Potassium carbonate (2.76 parts, 0.02 mole) was added and the reaction mixture stirred for 5 minutes at 25°–30° C. 1-Iodobutane (9.20 parts, 0.050 mole) was added and the reaction mixture heated at 60° C. for 16 hours. The acetone was then partially evaporated and the residue diluted with 100 parts of water whereupon an oily layer separated. The mixture was extracted with two 200 part portions of chloroform and the combined chloroform extracts dried over anhydrous sodium sulfate. The solvent was removed by distillation and the residue recrystllized from benzenemethanol to yield 4.3 parts (73.4% yield) of yellow product, $a_{max.}$ 57 liters g.$^{-1}$cm.$^{-1}$ at $\lambda_{max.}$ 395 m$\mu$.

The structure of the dye is

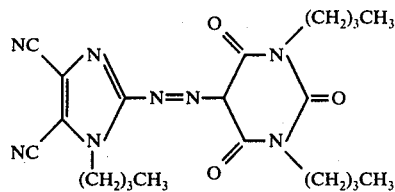

EXAMPLES 139–156

Examples 139—156 were prepared in a fashion similar to Examples 137 and 138 from 2-diazo-4,5-dicyanoimidazole and various heterocyclic coupling components.

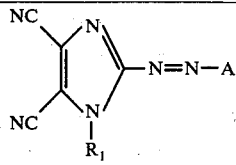

| Example No. | $R_1$ | A | $\lambda_{max.}$ (m$\mu$) | $a_{max.}$ (l. g.$^{-1}$cm.$^{-1}$) | Shade on Polyester |
|---|---|---|---|---|---|
| 139 | CH$_3$ | 1-(4'-chlorophenyl)-3-methyl-5-aminopyrazole | 430 | 65 | Yellow |
| 140 | C$_2$H$_5$ | " | 430 | 58 | Yellow |
| 141 | C$_3$H$_7$ | " | 435 | 56 | Yellow |
| 142 | CH$_3$ | 1-ethyl-3-cyano-4-methyl-6-hydroxy-pyrid-2-one | 435 | 92 | Yellow |
| 143 | CH$_2$C$_6$H$_5$ | " | 440 | 108 | Yellow |
| 144 | CH$_3$ | 1-n-hexyl-3-cyano-4-methyl-6-hydroxy-pyrid-2-one | 430 | 92 | Yellow |
| 145 | CH$_2$C$_6$H$_5$ | " | 435 | 85 | Yellow |
| 146 | CH$_3$ | 1-benzyl-3-cyano-4-methyl-6-hydroxy-pyrid-2-one | 430 | 97 | Yellow |
| 147 | CH$_2$C$_6$H$_5$ | " | 435 | 83 | Orange |
| 148 | C$_2$H$_5$ | 1-n-butyl-3-cyano-4-methyl-6-hydroxy-pyrid-2-one | 430 | 102 | Yellow |
| 149 | (CH$_2$)$_3$CH$_3$ | " | 430 | 95 | Yellow |
| 150 | CH$_3$ | 1,3-dimethyl barbituric acid | 395 | 59 | Yellow |
| 151 | CH$_3$ | 1,3-dicyclohexyl barbituric acid | 395 | 64 | Yellow |
| 152 | CH$_3$ | 1-methyl-3-phenyl barbituric acid | 395 | 54 | Yellow |
| 153 | C$_3$H$_7$ | 1-phenyl-3-methyl-5-pyrazolone | 450 | 57 | Yellow |
| 154 | CH$_2$C$_6$H$_5$ | " | 450 | 59 | Yellow |
| 155 | C$_2$H$_5$ | 4-hydroxycoumarin | 455 | 78 | Yellow |
| 156 | C$_2$H$_5$ | 2-methylindole | 437 | 99 | Yellow |

The following Examples typify the previously discussed aqueous and Thermosol dyeing procedures.

EXAMPLE 157 –

Aqueous (Pressure) Dyeing Procedure

Five grams of polyester fabric were put in an autoclave containing:
an aqueous dye paste (15% active ingredient) containing the dye of Example 1 . . . 0.1 gram
a long chain anionic sodium hydrocarbon sulfonate (10% solution) . . . 1.0 ml.
a long chain nonionic alcohol-ethylene oxide adduct (10% solution) . . . 0.5 ml.
ethylenediaminetetraacetic acid, sodium salt (1% solution) . . . 1.25 ml.
butyl benzoate carrier (10% solution) . . . 1.5 ml.
water . . . to 75 ml.
acetic acid . . . to adjust the pH to 5.5

The contents of the autoclave were heated for 1 hour at 265° F. The dyed fabric was then rinsed in water and dried. The polyester fabric was dyed a bright red shade.

EXAMPLE 158

Thermosol Procedure

A pad bath was prepared containing:
an aqueous dye paste (15% active ingredient) containing the dye of Example 23 . . . 50 grams
purified natural gum thickener . . . 20 grams
water . . . to 1 liter The pad bath was padded on 65/35 polyester/cotton fabric with a pickup of 50-65%, based on dry fabric weight, followed by drying (infrared predrying followed by hot air or hot can drying is desirable) to remove the water.

Thermosol processing, in which the polyester component is dyed with the disperse color, was accomplished by treating the dried pigment-padded fabric for 90 seconds at 213° C. Unfixed surface dye, whether on the polyester or cotton was removed by padding the fabric from an aqueous bath containing 50 g./l. sodium hydroxide and 40 g./l. sodium hydrosulfite at 27°–39° C., followed by steaming for 30 seconds. The fabric was then rinsed in water at 27° C., scoured for 5 minutes at 93° C. in water containing 1% ether alcohol sulfate detergent, rinsed in water at 27° C. and dried.

After dyeing and cleaning, the material may then be padded (for permanent press treatment) with a pickup of 50–65% (owf) with a bath containing:

g./l.
___ a dimethyloldihydroxyethyleneurea cross-linking

-continued

| | g./l. |
|---|---|
| agent | 200.0 |
| a p-octylphenoxy($C_2H_4O$)$_{9-10}$H wetting agent | 2.5 |
| a dispersed acrylic thermoplastic binding agent | 22.5 |
| a nonionic, paraffin-free, polyethylene emulsion which serves as a fabric softener | 22.5 |
| a nonionic polymer emulsion which imparts luster, a silky hand and antistatic properties to the fiber | 30.0 |
| a 20% aqueous zinc nitrate curing catalyst | 36.0 |

The resin-impregnated material is then air dried to remove the water content and finally cured at 163° C. for 15 minutes.

The durable-press treated polyester/cotton fabric was dyed an attractive bright bluish-red shade.

what is claimed is:

1. An azo dye of the generic formula

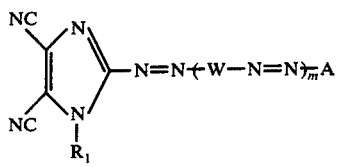

wherein
$R_1$ is $C_{1-4}$alkyl, —$CH_2$—CH=$CH_2$,

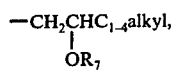

—($CH_2$)$_n$$R_8$, $C_{1-4}$alkyleneCN, $C_2H_4OR_7$, —$CH_2$—CH=CH—$R_8$, —$C_2H_4CONH_2$, —$C_2H_4CONHC_{1-4}$alkyl, —$C_2H_4CON(C_{1-4}$alkyl)$_2$ and —$C_2H_4CO_2C_{1-4}$-alkyl;

A is a coupling component selected from: a 5-or 6-membered heterocycle consisting of 5-aminopyrazole, 5-pyrazolone, barbituric acid, 6-hydroxypyrid-2-one, 4-hydroxycoumarin and 1,2-dialkylindole; a 1- or 2-naphthol group; and an aromatic amine of the formula

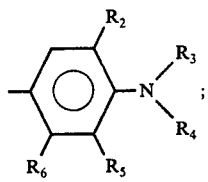

W is 1,4-naphthylene or

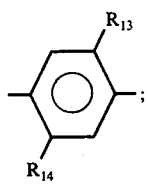

$R_2$ is H, F, Cl, $C_{1-4}$alkyl, $OC_{1-4}$alyl;
$R_3$ is cyclohexyl or $C_{1-4}$alkylene-$R_9$;
$R_2$ and $R_3$ together with the nitrogen atom optionally form a 6-membered ring optionally substituted with —OH, $OC_2H_4CN$ or $OCOC_{1-5}$alkyl.

$R_4$ is H,

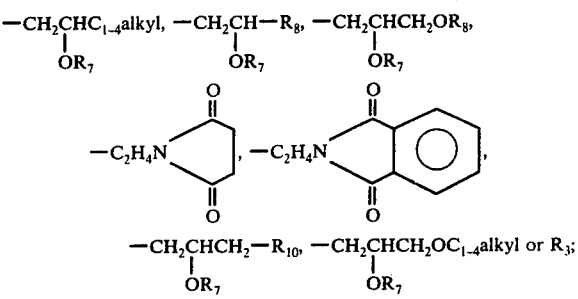

$R_3$ and $R_4$ together optionally form a 6-membered heterocyclic ring containing the nitrogen atom;

$R_5$ is H;

$R_6$ is H, F, Cl, Br, $C_{1-4}$alkyl, $OC_{1-4}$alkyl, OH, $C_{1-4}$hydroxyalkyl, NHCOCH=$CH_2$, NHCO$C_{1-4}$alkyl, NHCO$R_8$, NHCO$_2C_{1-4}$alkyl, NHCONH$C_{1-4}$alkyl, NHSO$_2C_{1-4}$alkyl, NHSO$_2R_8$, NHCO$_2R_8$, NHCONH$R_8$, NHCO$C_{1-4}$alkylene-$R_{10}$, NHCO$C_{1-4}$alkylene-O$C_{1-4}$alkylene-$R_{10}$, NHCO$_2C_{1-4}$alkyleneO$C_{1-4}$alkyl;

$R_5$ and $R_6$ together optionally form —CH=CH—CH=CH—;

$R_7$ is H or $C_{1-4}$acyl;

$R_8$ is phenyl or phenyl optionally substituted with 1-2 groups selected from Cl, Br, CN, $CF_3$, $NO_2$, $C_{1-4}$alkyl, $OC_{1-4}$alkyl, $N(C_{1-4}$alkyl)$_2$ and NHCO$C_{1-4}$alkyl;

$R_9$ is H, OH, CN, CO$C_{1-4}$alkyl, OCOCH=$CH_2$, OCO$C_{1-4}$alkylene-$R_{11}$, OCO$R_8$, CO$_2R_8$, CO$_2C_{1-4}$alkylene-$R_{12}$,

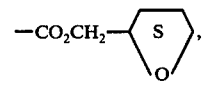

O$C_{1-4}$alkylene-$R_{10}$, CONH$C_{1-4}$alkylene-$R_{11}$, SO$_2R_8$, OCONH$C_{1-4}$alylene-$R_{10}$, NHCO$C_{1-4}$alkylene-$R_{10}$, NHCONH$R_8$, NHCO$R_8$ or $R_8$;

$R_{10}$ is CN, OH, Cl, Br or $R_7$;

$R_{11}$ is H, Cl, Br, $OC_{1-4}$alkyl or phenyl;

$R_{12}$ is H, OH, $OC_{1-4}$alkyl, OCO$C_{1-4}$alkylene-$R_{11}$ or OCO$R_8$;

$R_{13}$ and $R_{14}$ are independently H, $C_{1-4}$alkyl, $C_{1-4}$alkoxy or Cl;

m is 0 or 1; and n is 1 to 3.

2. An azo dye of claim 1 having the formula

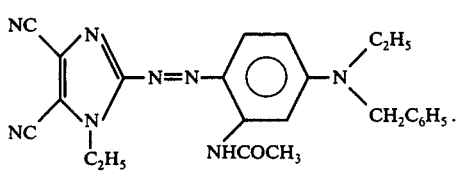

3. An azo dye of claim 1 having the formula

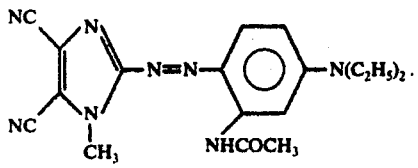

4. An azo dye of claim 1 having the formula

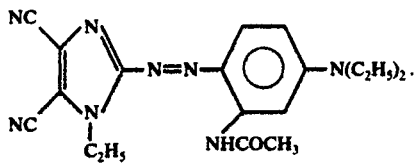

5. An azo dye of claim 1 having the formula

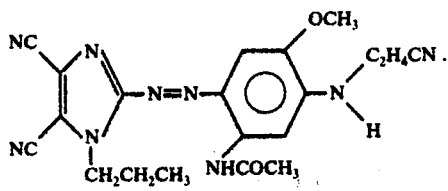

6. An azo dye of claim 1 having the formula

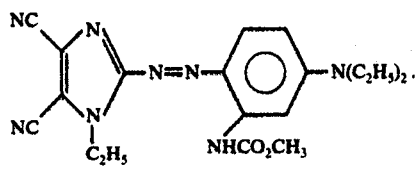

7. An azo dye of claim 1 having the formula

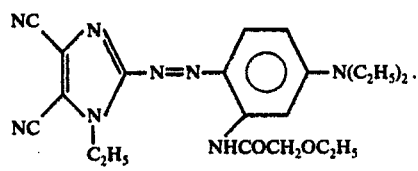

8. An azo dye of claim 1 having the formula

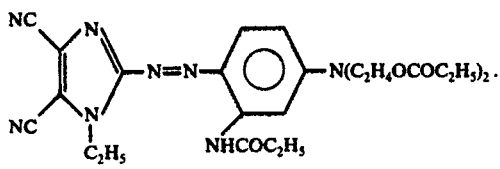

9. An azo dye of claim 1 having the formula

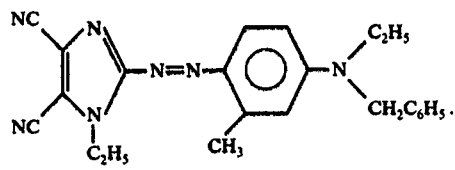

10. An azo dye of claim 1 having the formula

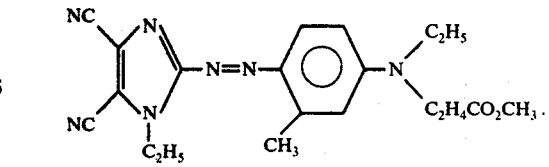

11. An azo dye of claim 1 having the formula

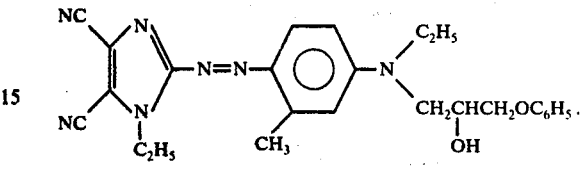

12. An azo dye of claim 1 having the formula

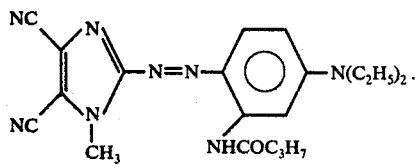

13. An azo dye of claim 1 having the formula

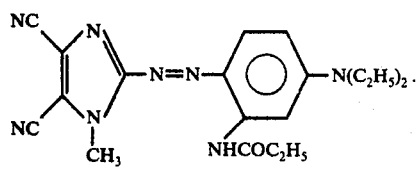

14. An azo dye of claim 1 having the formula

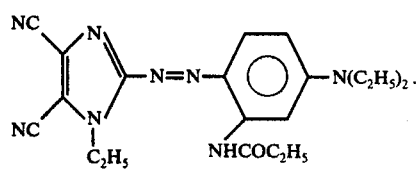

15. An azo dye of claim 1 having the formula

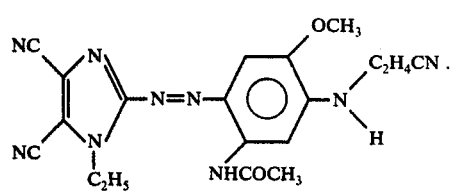

16. An azo dye of claim 1 having the formula

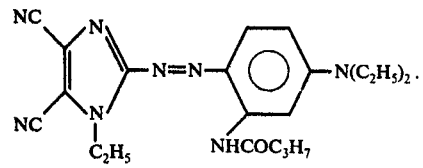

17. An azo dye of claim 1 having the formula

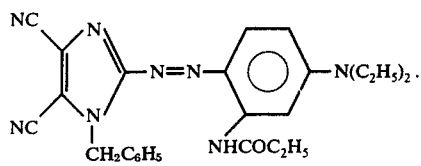
18. An azo dye of claim 1 having the formula
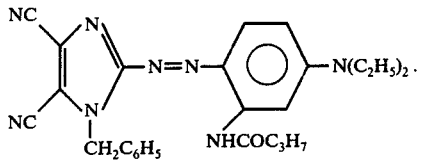
19. An azo dye of claim 1 having the formula
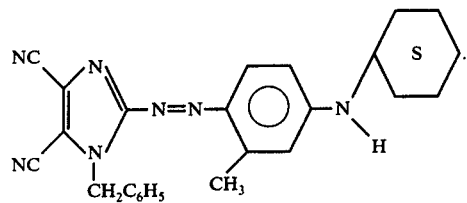
20. An azo dye of claim 1 having the formula
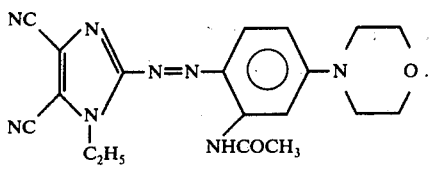
21. An azo dye of claim 1 having the formula
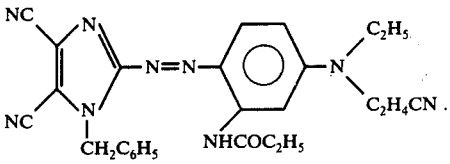
22. An azo dye of claim 1 having the formula
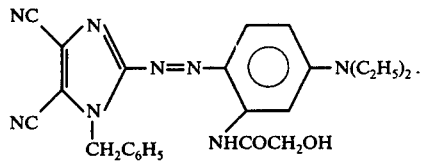
23. An azo dye of claim 1 having the formula
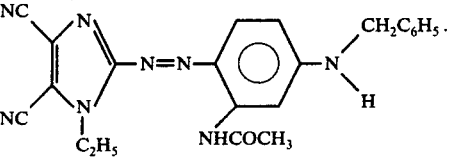
* * * * *

UNITED STATES PATENT OFFICE
CERTIFICATE OF CORRECTION

PATENT NO. : 4,097,475
DATED : June 27, 1978
INVENTOR(S) : Daniel Shaw James

It is certified that error appears in the above-identified patent and that said Letters Patent are hereby corrected as shown below:

Claim 1, column 32, line 46, change "OCONHC$_{1-4}$alylene-R$_{10}$" to -- OCONHC$_{1-4}$alkylene-R$_{10}$ -- .

Signed and Sealed this

Twentieth Day of February 1979

[SEAL]

Attest:

RUTH C. MASON
Attesting Officer

DONALD W. BANNER
Commissioner of Patents and Trademarks